US012139570B2

United States Patent
Asada et al.

(10) Patent No.: US 12,139,570 B2
(45) Date of Patent: Nov. 12, 2024

(54) RETARDATION FILM AND PRODUCTION METHOD FOR RETARDATION FILM

(71) Applicant: ZEON CORPORATION, Tokyo (JP)

(72) Inventors: Takeshi Asada, Tokyo (JP); Hironari Sudeji, Tokyo (JP); Kensaku Fujii, Tokyo (JP); Yusuke Yasu, Tokyo (JP); Hiroya Nishioka, Tokyo (JP)

(73) Assignee: ZEON CORPORATION, Chiyoda-ku (JP)

( * ) Notice: Subject to any disclaimer, the term of this patent is extended or adjusted under 35 U.S.C. 154(b) by 1029 days.

(21) Appl. No.: 16/981,693

(22) PCT Filed: Mar. 18, 2019

(86) PCT No.: PCT/JP2019/011299
§ 371 (c)(1),
(2) Date: Sep. 17, 2020

(87) PCT Pub. No.: WO2019/181893
PCT Pub. Date: Sep. 26, 2019

(65) Prior Publication Data
US 2021/0032396 A1    Feb. 4, 2021

(30) Foreign Application Priority Data

Mar. 19, 2018 (JP) .................................. 2018-051030
Nov. 30, 2018 (JP) .................................. 2018-225494

(51) Int. Cl.
| | |
|---|---|
| *C08F 297/04* | (2006.01) |
| *B29C 48/00* | (2019.01) |
| *B29C 48/88* | (2019.01) |
| *B29C 55/06* | (2006.01) |
| *C08J 5/18* | (2006.01) |
| *G02B 1/04* | (2006.01) |
| *G02B 5/30* | (2006.01) |
| *B29K 25/00* | (2006.01) |
| *B29K 96/04* | (2006.01) |
| *B29K 105/00* | (2006.01) |

(52) U.S. Cl.
CPC ........ *C08F 297/04* (2013.01); *B29C 48/0018* (2019.02); *B29C 48/914* (2019.02); *B29C 55/06* (2013.01); *C08J 5/18* (2013.01); *G02B 1/04* (2013.01); *G02B 5/3083* (2013.01); *B29K 2025/00* (2013.01); *B29K 2096/04* (2013.01); *B29K 2105/0085* (2013.01); *B29K 2995/0034* (2013.01); *C08J 2347/00* (2013.01)

(58) Field of Classification Search
CPC ........ C08F 297/04; C08J 5/18; C08J 2347/00; B29C 55/06; B29C 48/0018; B29C 48/914; G02B 1/04; G02B 5/3083; B29K 2995/0034; B29K 2025/00; B29K 2096/04; B29K 2105/0085
See application file for complete search history.

(56) References Cited

U.S. PATENT DOCUMENTS

| | | | |
|---|---|---|---|
| 6,565,974 B1 | 5/2003 | Uchiyama et al. | |
| 8,203,676 B2 | 6/2012 | Uchiyama et al. | |
| 2016/0146977 A1 | 5/2016 | Ishiguro et al. | |

FOREIGN PATENT DOCUMENTS

| | | | | |
|---|---|---|---|---|
| JP | H05164920 A | 6/1993 | | |
| JP | 3031014 B2 * | 2/2000 | ............... | G02B 5/30 |
| JP | 2006111650 A | 4/2006 | | |
| JP | 2006142561 A * | 6/2006 | ......... | B29C 47/0021 |
| JP | 2006143799 A | 6/2006 | | |
| JP | 2006348096 A | 12/2006 | | |
| JP | 2011013378 A | 1/2011 | | |
| WO | 0026705 A1 | 5/2000 | | |
| WO | 2008146924 A1 | 12/2008 | | |
| WO | 2015002020 A1 | 1/2015 | | |
| WO | 2015005292 A1 | 1/2015 | | |

OTHER PUBLICATIONS

Sep. 22, 2020, International Preliminary Report on Patentability issued in the International Patent Application No. PCT/JP2019/011299.
Jun. 11, 2019, International Search Report issued in the International Patent Application No. PCT/JP2019/011299.
Aug. 18, 2023, Office Action issued by the United States Patent and Trademark Office in the U.S. Appl. No. 16/981,694.
M. W. Matsen, Effect of Architecture on the Phase Behavior of AB-Type Block Copolymer Melts, Macromolecules, 2012, pp. 2161-2165, vol. 45, Issue 4.

* cited by examiner

*Primary Examiner* — Robert D Harlan
(74) *Attorney, Agent, or Firm* — KENJA IP LAW PC

(57) ABSTRACT

A phase difference film composed of a resin C containing a copolymer P including a polymerization unit A and a polymerization unit B, the phase difference film including a lamellar phase separation structure that generates a structural birefringence, the phase separation structure including a phase (A) having the polymerization unit A as a main component and a phase (B) having the polymerization unit B as a main component, and the phase difference film satisfying the formulae (1A): f(A)>0.5 and (2):D(A)>D(B), or the formulae (1B): f(B)>0.5 and (2). f(A) represents a total weight ratio of the polymerization unit A in the copolymer P, f(B) represents a total weight ratio of the polymerization unit B in the copolymer P, D(A)=ReA(450)/ReA(550), D(B)=ReB(450)/ReB(550), and ReA(450), ReA(550), ReB(450) and ReB(550) are as defined in the description.

14 Claims, 1 Drawing Sheet

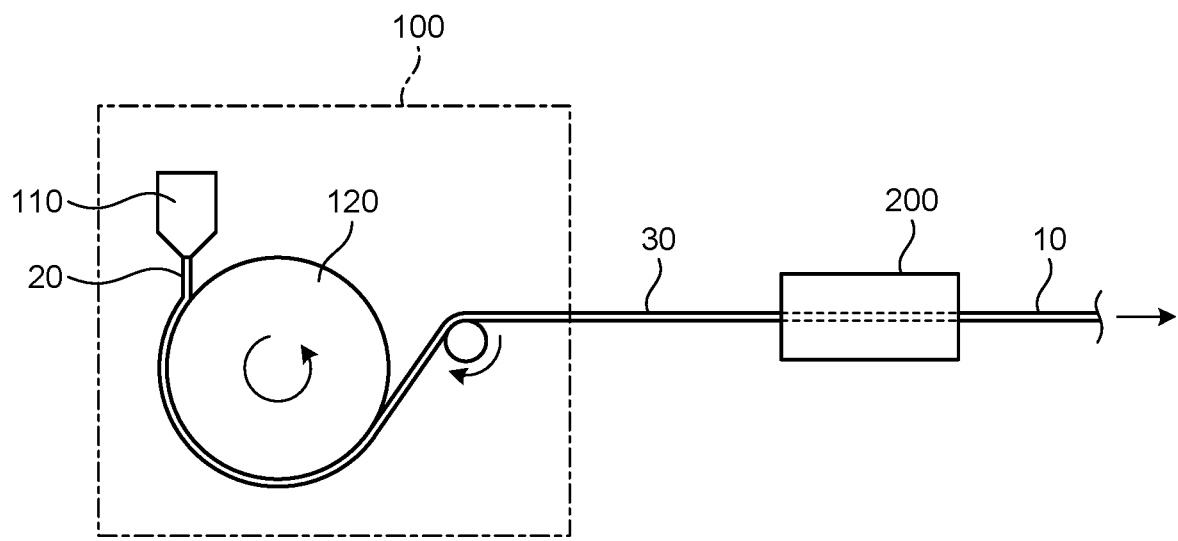

RETARDATION FILM AND PRODUCTION METHOD FOR RETARDATION FILM

FIELD

The present invention relates to a phase difference film and a method for producing a phase difference film.

BACKGROUND

Various types of phase difference films are often disposed in a display device such as a liquid crystal display device for the purpose of improving display quality thereof. As the phase difference film, a film having a multilayer structure (Patent Literatures 1 and 2) and a film using a block copolymer having a lamellar structure (Patent Literature 3) have been developed. Further, an optical film formed from a resin has been known (Patent Literatures 4 to 9).

CITATION LIST

Patent Literature

Patent Literature 1: Japanese Patent Application Laid-Open No. 2011-013378 A
Patent Literature 2: International Publication No. 2008/146924
Patent Literature 3: Japanese Patent Application Laid-Open No. Hei. 05-164920 A
Patent Literature 4: Japanese Patent Application Laid-Open No. 2006-111650 A
Patent Literature 5: Japanese Patent Application Laid-Open No. 2006-143799 A
Patent Literature 6: Japanese Patent Application Laid-Open No. 2006-348096 A
Patent Literature 7: Japanese Patent Application Laid-Open No. 2006-142561 A
Patent Literature 8: International Publication No. 2000/026705 (corresponding publication: U.S. Pat. No. 6,565,974)
Patent Literature 9: International Publication No. 2015/005292

SUMMARY

Technical Problem

The film in Patent Literature 2, in which the desired optical properties are achieved by combining a large number of layers, has a complicated structure, thus causing a high production cost of the phase difference film and a low productivity.

Further, it is desirable that the variation of optical properties of the phase difference film due to difference of a wavelength of light passing therethrough is kept at a low level. For this reason, the phase difference film preferably has a reverse wavelength dispersion property. The term "reverse wavelength dispersion property" described herein refers to a property of film satisfying $Rth(450)/Rth(550)<1$ or $Re(450)/Re(550)<1$. "$Rth(450)$" described herein refers to the retardation of a film in the thickness direction measured at a wavelength of 450 nm, "$Rth(550)$" refers to the retardation of the film in the thickness direction measured at a wavelength of 550 nm, "$Re(450)$" described herein refers to the retardation of a film in the in-plane direction measured at a wavelength of 450 nm, and "$Re(550)$" refers to the retardation of the film in the in-plane direction measured at a wavelength of 550 nm.

Thus, there have been demanded a phase difference film which has a reverse wavelength dispersion property and can be easily produced at a low cost; and a method for producing such a phase difference film.

Solution to Problem

The present inventor has conducted intense research to solve the aforementioned problems. As a result, the present inventor has found that the aforementioned problems can be solved by constituting a lamellar phase separation structure generating a structural birefringence by using a resin including a specific copolymer P, thereby completing the present invention. That is, the present invention provides the following.

<1> A phase difference film composed of a resin C containing a copolymer P including a polymerization unit A and a polymerization unit B,
the phase difference film including a lamellar phase separation structure that generates a structural birefringence,
the phase separation structure including a phase (A) having the polymerization unit A as a main component and a phase (B) having the polymerization unit B as a main component, and
the phase difference film satisfying the following formulae (1A) and (2), or the following formulae (1B) and (2), $$f(A)>0.5 \tag{1A}$$

$$f(B)>0.5 \tag{1B}$$

$$D(A)>D(B) \tag{2}$$

wherein
f(A) represents a total weight ratio of the polymerization unit A in the copolymer P,
f(B) represents a total weight ratio of the polymerization unit B in the copolymer P, $$D(A)=ReA(450)/ReA(550),$$

$$D(B)=ReB(450)/ReB(550),$$

ReA(450) represents an in-plane direction retardation (nm) of a film (A) formed from a polymer (A) composed of the polymerization unit A measured at a wavelength of 450 nm,
ReA(550) represents an in-plane direction retardation (nm) of the film (A) measured at a wavelength of 550 nm,
ReB(450) represents an in-plane direction retardation (nm) of a film (B) formed from a polymer (B) composed of the polymerization unit B measured at a wavelength of 450 nm, and
ReB(550) represents an in-plane direction retardation (nm) of the film (B) measured at a wavelength of 550 nm.
<2> The phase difference film according to <1>, further satisfying the following formula (3):

$$D(A) \geq 1.06 \tag{3}$$

<3> The phase difference film according to <1> or <2>, further satisfying the following formula (4):

$$(D(A)-D(B)) \geq 0.04 \tag{4}$$

<4> The phase difference film according to any one of <1> to <3>, wherein an in-plane direction retardation Re(550) measured at a wavelength of 550 nm is 0 nm or more and 10 nm or less.

<5> The phase difference film according to any one of <1> to <4>, wherein a ratio (Rth(450)/Rth(550)) of a thickness-direction retardation Rth(450) measured at a wavelength of 450 nm relative to a thickness-direction retardation Rth(550) measured at a wavelength of 550 nm is 0 or more and less than 1.

<6> The phase difference film according to <5>, wherein the ratio (Rth(450)/Rth(550)) of the thickness-direction retardation Rth(450) relative to the thickness-direction retardation Rth(550) is 0.75 or more and 0.95 or less.

<7> The phase difference film according to any one of <1> to <6>, wherein each of thicknesses of the phase (A) and the phase (B) in the lamellar phase separation structure is 50 nm or less.

<8> The phase difference film according to any one of <1> to <7>, wherein an absolute value (|n(a)−n(b)|) of a difference between a refractive index n(a) of the polymer (A) and a refractive index n(b) of the polymer (B) is 0.05 or more.

<9> The phase difference film according to any one of <1> to <8>, wherein an interphase distance in the phase separation structure is 200 nm or less.

<10> The phase difference film according to any one of <1> to <9>, wherein the copolymer P is a block polymer having a block (A) having the polymerization unit A as a main component and a block (B) having the polymerization unit B as a main component.

<11> The phase difference film according to any one of <1> to <10>, wherein
the copolymer P includes a triblock copolymer P', and
the triblock copolymer P' is an (A)-(B)-(A) triblock copolymer having a block (A) having a polymerization unit A as a main component and a block (B) having a polymerization unit B as a main component.

<12> The phase difference film according to any one of <1> to <11>, wherein
the copolymer P includes a pentablock copolymer P″, and
the pentablock copolymer P″ is an (A)-(B)-(A)-(B)-(A) pentablock copolymer having a block (A) having the polymerization unit A as a main component and a block (B) having the polymerization unit B as a main component.

<13> A method for producing the phase difference film according to any one of <1> to <12>, the method comprising:
a first step of performing melt extrusion of the resin C including the copolymer P having the polymerization unit A and the polymerization unit B onto a cooling roll to obtain an intermediate film; and
a second step of subjecting the intermediate film to a stretching treatment, wherein
a thermal softening temperature Td of the copolymer P and a temperature Tc of the cooling roll satisfy the following formula (5):

$$Tc < Td - 50° C. \tag{5}$$

<13-1> The method for producing a phase difference film according to <13>, wherein an extrusion temperature of the resin C in the first step is Td+110° C. or higher and Td+170° C. or lower.

<13-2> The method for producing a phase difference film according to <13> or <13-1>, wherein a stretching temperature in the stretching treatment in the second step is Td or higher and Td+20° C. or lower, and a stretching ratio in the stretching treatment in the second step is 1.1 times or more and 5.0 times or less.

<13-3> The method for producing the phase difference film according to any one of <13>, <13-1>, and <13-2>, wherein an in-plane direction retardation Re(450) of the phase difference film at a measurement wavelength of 450 nm, an in-plane direction retardation Re(550) of the phase difference film at a measurement wavelength of 550 nm, and an in-plane direction retardation Re(650) of the phase difference film at a measurement wavelength of 650 nm satisfy the following formula (6) and formula (7).

$$0.70 \leq Re(450)/Re(550) \leq 0.95 \tag{6}$$

$$1.02 \leq Re(650)/Re(550) \leq 1.20 \tag{7}$$

<14> The method for producing a phase difference film according to any one of <13>, <13-1>, <13-2>, and <13-3>, wherein the formula (1A) and (2) are satisfied.

<15> The method for producing a phase difference film according to any one of <13>, <13-1>, <13-2>, and <13-3>, wherein the formula (1B) and (2) are satisfied.

The present disclosure also provides the following.

[1B] A method for producing a phase difference film including:
a first step of performing melt extrusion of a resin C including a copolymer P having a polymerization unit A and a polymerization unit B onto a cooling roll to obtain an intermediate film; and
a second step of subjecting the intermediate film to a stretching treatment, wherein
the polymerization unit A is an aromatic vinyl-based unit and the polymerization unit B is a hydrogenated chain conjugated diene-based unit;
a total weight ratio f(A) of the polymerization unit A in the copolymer P satisfies the following formula (1C); and
a thermal softening temperature Td of the copolymer P and a temperature Tc of the cooling roll satisfy the following formula (5):

$$0.5 < f(A) \leq 0.85 \tag{1C},$$

$$Tc < Td - 50° C. \tag{5}.$$

[2B] The method for producing a phase difference film according to [1B], wherein the extrusion temperature of the resin in the first step is Td+110° C. or higher and Td+170° C. or lower.

[3B] The method for producing a phase difference film according to [1B] or [2B], wherein the stretching temperature in the stretching treatment in the second step is Td or higher and Td+20° C. or lower, and the stretching ratio in the stretching treatment in the second step is 1.1 times or more and 5.0 times or less.

[4B] The method for producing a phase difference film according to any one of [1B] to [3B], wherein the in-plane direction retardation Re(450) of the phase difference film at a measurement wavelength of 450 nm, the in-plane direction retardation Re(550) of the phase difference film at a measurement wavelength of 550 nm, and the in-plane direction retardation Re(650) of the phase difference film at a measurement wavelength of 650 nm satisfy the following formula (6) and formula (7).

$$0.70 \leq Re(450)/Re(550) \leq 0.95 \tag{6}$$

$$1.02 \leq Re(650)/Re(550) \leq 1.20 \tag{7}$$

Advantageous Effects of Invention

According to the present invention, there can be provided a phase difference film which has a reverse wavelength dispersion property and can be easily produced at a low cost; and a method for producing such a phase difference film.

BRIEF DESCRIPTION OF DRAWINGS

FIG. 1 is a schematic diagram schematically showing a scheme of producing a phase difference film by a producing method according to an embodiment of the present invention

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with a length that is 5 times or more the width, and preferably a film with a length that is 10 times or more the width, and specifically refers to a film having a length that allows a film to be wound up into a rolled shape for storage or transportation. The upper limit of the length of the film is not particularly limited, and may be 100,000 times or less the width.

In the following description, a "plate" encompasses not only a rigid member, but also a flexible member such as a resin film.

In the following description, an in-plane direction retardation Re of a film is a value represented by "Re=(nx−ny)×d" unless otherwise specified. A thickness-direction retardation Rth of a film is a value represented by "Rth=[{(nx+ny)/2}−nz]×d" unless otherwise specified. Herein, nx represents a refractive index in a direction in which the maximum refractive index is given among directions perpendicular to the thickness direction of the film (in-plane directions), ny represents a refractive index in a direction, among the above-mentioned in-plane directions of the film, perpendicular to the direction giving nx, nz represents a refractive index in the thickness direction of the film, and d represents the thickness of the film. The measurement wavelength is 550 nm, unless otherwise specified.

Whether an intrinsic birefringence value of a resin is positive or negative is defined by the refractive index behavior of a molded product of the resin of interest upon being stretched. That is, a resin having a positive intrinsic birefringence value is a resin giving a molded product of which the refractive index in the stretching direction increases after stretching. Further, a resin having a negative intrinsic birefringence value is a resin giving a molded product of which the refractive index in the stretching direction decreases after stretching. The intrinsic birefringence value may be calculated from the dielectric constant distribution.

Further, the phrase "a specific polymerization unit having a positive intrinsic birefringence value" means that the polymer composed of only the polymerization unit of interest has a positive intrinsic birefringence value, while the phrase "a specific polymerization unit having a negative intrinsic birefringence value" means that the polymer composed of only the polymerization unit of interest has a negative intrinsic birefringence value. Thus, whether an intrinsic birefringence value of a polymerization unit is positive or negative can be easily determined by preparing a homopolymer composed of only the polymerization unit of interest, molding the polymer into a molded product of any shape, stretching the molded product, and measuring the optical properties thereof. It is generally known that many of polymerization units of hydrocarbons such as alkene and diene have a positive intrinsic birefringence value, while many of polymers of hydrocarbons having an aromatic ring in a side chain such as styrene and vinylnaphthalene have a negative intrinsic birefringence value.

In the following description, a front direction of a certain film means the normal direction of the principal surface of the film, and specifically refers to a direction at the polar angle 0° and the azimuth angle 0° of the principal surface, unless otherwise specified.

In the following description, a tilted direction of a certain film means a direction which is neither parallel nor perpendicular to the principal surface of the film, and specifically refers to a direction in a polar angle range of larger than 0° and smaller than 90° of the principal surface, unless otherwise specified.

In the following description, a direction of an element being "parallel", "perpendicular" or "orthogonal" may allow an error within the range of not impairing the advantageous effects of the present invention, for example, within a range of ±3°, ±2°, or ±1°, unless otherwise specified.

In the following description, a slow axis of a film represents a slow axis in the plane of the film, unless otherwise specified.

In the following description, a polymerization unit having a structure formed by polymerization of a certain monomer may be expressed using the name of the monomer. For example, a polymerization unit having a structure formed by polymerization of 2-vinylnaphthalene may be referred to as a "2-vinylnaphthalene unit", and a polymerization unit having a structure formed by polymerization of isoprene may be referred to as an "isoprene unit".

[1. Phase Difference Film]

The phase difference film of the present embodiment is formed of a resin C.

[1.1. Resin C]

The resin C contains a specific copolymer P. The copolymer P includes a polymerization unit A and a polymerization unit B. The copolymer P is preferably a block copolymer having a block (A) having the polymerization unit A as a main component and a block (B) having the polymerization unit B as a main component. Generally, a block copolymer is a polymer having a molecular structure in which a plurality of types of blocks are connected, and each block is a chain formed by connecting polymerization units. A specific block copolymer in an embodiment of the present invention has specific blocks (A) and (B). In the following description, such a specific block copolymer may be simply referred to as a "block copolymer". Herein, the polymerization unit which is a main component in a certain block means a polymerization unit which is contained in an amount of 50% by weight or more relative to the total weight of the polymerization units constituting the block. The resin C containing the copolymer P is usually a thermoplastic resin.

The polymerization unit A may have a negative intrinsic birefringence value. On the other hand, the polymerization unit B may have a positive intrinsic birefringence value.

The polymerization unit A is preferably an aromatic vinyl-based unit. The aromatic vinyl-based unit refers to a polymerization unit having a structure obtained by polymerization of an aromatic vinyl-based compound. Such an aromatic vinyl-based compound includes an aromatic vinyl compound and a derivative thereof. The aromatic vinyl compound refers to a hydrocarbon compound having a structure in which a vinyl group is bonded to an aromatic ring. The derivative of the aromatic vinyl compound includes a compound having a structure in which one or more hydrogen atoms of the aromatic vinyl compound are substituted with a substituent. The aromatic vinyl-based unit includes a polymerization unit obtained by any appropriate producing method as long as the unit has the foregoing structure.

Preferable examples of the polymerization unit A may include a unit represented by the following general formula (A). The unit represented by the following general formula (A) is an aromatic vinyl-based unit.

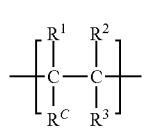
(A)

$R^c$ is a group selected from the group consisting of a phenyl group, a biphenylyl group (for example, a 4-biphenylyl group, a 2-biphenylyl group, and a 3-biphenylyl group), a naphthyl group (for example, a 1-naphthyl group and a 2-naphthyl group), an anthracenyl group (for example, an anthracene-1-yl group, an anthracene-2-yl group, and an anthracene-9-yl group), a phenanthrenyl group (for example, a phenanthrene-1-yl group, a phenanthrene-2-yl group, a phenanthrene-3-yl group, a phenanthrene-4-yl group, and a phenanthrene-9-yl group), a naphthaceneyl group, (for example, a naphthacene-1-yl group, a naphthacene-2-yl group, and a naphthacene-5-yl group), a pentaceneyl group (for example, a pentacene-1-yl group, a pentacene-2-yl group, a pentacene-5-yl group, and a pentacene-6-yl group), and a terphenylyl group.

$R^1$ to $R^3$ are each independently a group selected from the group consisting of a hydrogen atom and an alkyl group of 1 to 12 carbon atoms. Examples of such an alkyl group may include a methyl group, an ethyl group, a propyl group, and an hexyl group.

In the formula (A),
$R^1$ is preferably a hydrogen atom.
$R^2$ and $R^3$ are preferably a hydrogen atom.
$R^c$ is preferably a naphthyl group.
More preferably, $R^2$ and $R^3$ are each a hydrogen atom and $R^c$ is a naphthyl group, or $R^2$ and $R^3$ are each a hydrogen atom and $R^1$ is a hydrogen atom. More preferably, $R^2$ and $R^3$ are each a hydrogen atom, $R^c$ is a naphthyl group, and $R^1$ is a hydrogen atom.

The polymerization unit A may be obtained by polymerization of a monomer (a) which gives the polymerization unit A. Examples of the monomer (a) may include an aromatic vinyl-based compound (for example, vinylnaphthalene and its derivatives). Examples of the vinylnaphthalene may include 1-vinylnaphthalene and 2-vinylnaphthalene. Examples of the vinylnaphthalene derivatives may include α-methyl-1-vinylnaphthalene, α-ethyl-1-vinylnaphthalene, α-propyl-1-vinylnaphthalene, α-hexyl-1-vinylnaphthalene, α-methyl-2-vinylnaphthalene, α-ethyl-2-vinylnaphthalene, α-propyl-2-vinylnaphthalene, and α-hexyl-2-vinylnaphthalene. As the vinylnaphthalene and its derivatives, 2-vinylnaphthalene is preferable from the viewpoint of convenient industrial availability.

The copolymer P may solely have only one type thereof as the polymerization unit A, or may have two or more types thereof in combination at any ratio. Therefore, as the monomer (a) for forming the polymerization unit A, one type thereof may be solely used, and two or more types thereof may also be used in combination at any ratio.

The polymerization unit B is preferably a hydrogenated chain conjugated diene-based unit. The hydrogenated chain conjugated diene-based unit refers to a polymerization unit having a structure obtained by polymerization of a chain conjugated diene-based compound and hydrogenating the product. The chain conjugated diene-based compound includes a chain conjugated diene compound and its derivatives. The chain conjugated diene compound refers to a chain hydrocarbon compound having a conjugated diene structure. The derivative of the chain conjugated diene compound includes a compound having a structure in which one or more hydrogen atoms of the chain conjugated diene compound are substituted with a substituent. The hydrogenated chain conjugated diene-based unit includes a polymerization unit obtained by any appropriate producing method as long as the unit has the foregoing structure.

Preferable examples of the polymerization unit B may include units represented by the following general formula (B-1) and units represented by the following general formula (B-2). The units represented by the following general formulae (B-1) and (B-2) are hydrogenated chain conjugated diene-based units.

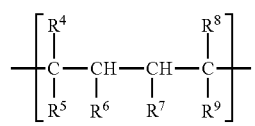
(B-1)

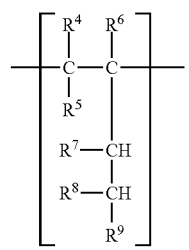
(B-2)

$R^4$ to $R^9$ are each independently a group selected from the group consisting of a hydrogen atom and an alkyl group of 1 to 6 carbon atoms. Examples of such an alkyl group may include a methyl group, an ethyl group, a propyl group, and a hexyl group. It is preferable that $R^4$ to $R^9$ are each independently a hydrogen atom or a methyl group.

Particularly preferable examples of the polymerization unit B may include polymerization units represented by any of the following formulae (b-1) to (b-5). The polymerization unit represented by any of formulae (b-1) to (b-3) represents a hydrogenated isoprene unit. The polymerization unit represented by the formula (b-4) or (b-5) represents a hydrogenated butadiene unit.

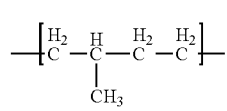
(b-1)

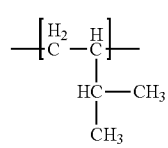
(b-2)

-continued

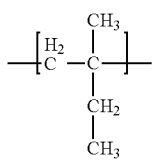
(b-3)

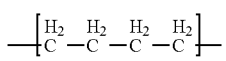
(b-4)

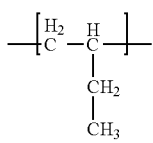
(b-5)

The polymerization unit B may be obtained by polymerization of a monomer (b), which can give the polymerization unit B, to produce a polymerization unit, and subsequent hydrogenation of double bonds, if any, in the polymerization unit. Examples of the monomer (b) may include a compound represented by the following general formula (bm).

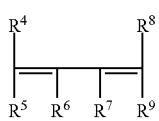
(bm)

Preferable examples of the monomer (b) may include butadiene (all of $R^4$ to $R^9$ in the formula (bm) are a hydrogen atom), isoprene ($R^6$ or $R^7$ of $R^4$ to $R^9$ in the formula (bm) is a methyl group and the other groups are each a hydrogen atom), 1,3-pentadiene, 2,3-dimethyl-1,3-butadiene, 1,3-hexadiene, 2-methyl-1,3-pentadiene, 3-methyl-1,3-pentadiene, and 2,4-dimethyl-1,3-pentadiene. Among these, butadiene and isoprene are more preferable from the viewpoint of obtaining the resin C excellent in transparency, heat resistance, and processability.

Preferable examples of the polymerization unit B may include ones with the same substituents as $R^4$ to $R^9$ of the preferable examples of the monomer (b) as the $R^4$ to $R^9$.

When the polymerization unit B is a chain conjugated diene-based unit, the hydrogenation rate of the double bonds of the chain conjugated diene-based unit is preferably 90% or more, more preferably 95% or more, and particularly preferably 97% or more. When the hydrogenation rate is high as described above, the phase difference film having desired optical properties can be produced particularly easily. Furthermore, the mechanical properties of the phase difference film can be usually improved. The hydrogenation rate may be measured by $^1$H-NMR.

The copolymer P may solely have only one type thereof as the polymerization unit B, or may have two or more types thereof in combination at any ratio. Therefore, as the monomer (b) for forming the polymerization unit B, one type thereof may be solely used, and two or more types thereof may also be used in combination at any ratio.

When the copolymer P has the block (A), the block (A) may have an optional polymerization unit other than the polymerization unit A. Examples of such an optional polymerization unit may include a unit formed by polymerization of an optional monomer copolymerizable with the monomer (a) and a unit formed by hydrogenation of the foregoing unit.

When the copolymer P has the block (B), the block (B) may have an optional polymerization unit other than the polymerization unit B. Examples of such an optional polymerization unit may include a polymerization unit that is formed by polymerization of the monomer (b) and has unhydrogenated double bonds, a unit formed by polymerization of an optional monomer copolymerizable with the monomer (b), and a unit formed by hydrogenation of the foregoing units.

However, from the viewpoint of the optical properties and mechanical properties exhibited by the resin C, it is preferable that the ratio of the polymerization unit A in the block (A) and the ratio of the polymerization unit B in the block (B) are both high. The ratio of the polymerization unit A in the block (A) is preferably 50% by weight or more, more preferably 75% by weight or more, and still more preferably 95% by weight or more, and is preferably 100% by weight or less, and particularly preferably, the block (A) is composed only of the polymerization unit A. The ratio of the polymerization unit B in the block (B) is preferably 50% by weight or more, more preferably 75% by weight or more, and still more preferably 95% by weight or more, and is preferably 100% by weight or less, and particularly preferably, the block (B) is composed only of the polymerization unit B.

The blocks (A) and (B) are preferably incompatible with each other. The incompatibility of these makes it easier to obtain a phase separation structure in the phase difference film. Whether the blocks (A) and (B) are incompatible may be determined on the basis of the compatibility of the homopolymer consisting of the polymerization unit A and the homopolymer consisting of the polymerization unit B, which have a molecular weight equivalent to the size of these blocks in the block copolymer. The compatibility of such homopolymers may be determined on the basis of whether or not the phases are separated from each other when these homopolymers are mixed to form a mixture and the mixture is placed at a temperature at which the homopolymers are melted.

The molecular structure of the copolymer P is not particularly limited as long as it has the polymerization unit A and the polymerization unit B, and may be a molecular structure having any optional structure. For example, when the copolymer P is a block copolymer, the block copolymer may be a linear-type block copolymer or a graft-type block copolymer.

Examples of the linear-type block copolymer may include: a diblock copolymer having a block configuration of (A)-(B) in which the blocks (A) and (B) are connected to each other; a triblock copolymer (in the present application, which may be referred to as "triblock copolymers P'") having a block configuration of (A)-(B)-(A) in which the block (A), the block (B), and another block (A) are connected in that order; a pentablock copolymer (in the present application, which may be referred to as a "pentablock copolymer P''") having a block configuration in which three blocks (A) and two blocks (B) are connected in the order of (A)-(B)-(A)-(B)-(A); and a linear block copolymer having a block configuration in which a greater number of blocks are connected. Examples of the block configuration in which a greater number of blocks are connected may include (A)-((B)-(A))n-(B)-(A), and (B)-((A)-(B))n-(A)-(B) (n is an integer greater than or equal to 1).

Examples of the graft type block copolymer may include a block copolymer having a block configuration of (A)-g-(B) in which the block (B) is connected as a side chain to the block (A).

From the viewpoint of desired optical properties exhibited by the resin C, the copolymer P may preferably be a block copolymer having a molecular structure having two or more polymer blocks (A) and one or more polymer blocks (B) per molecule. More preferably, the block copolymer may be a triblock copolymer having a block configuration of (A)-(B)-(A).

In yet another embodiment, the block copolymer may preferably be a pentablock copolymer having a block configuration of (A)-(B)-(A)-(B)-(A).

The resin C may solely contain only one type thereof as the copolymer P, or may contain a combination of two or more types thereof at any ratio.

The resin C may be composed only of the copolymer P or may contain an optional component in addition to the copolymer P. Examples of the optional components may include an additive such as a dye, a pigment, and an antioxidant. The ratio of such an optional component may be set to fall within a range that does not impair the advantageous effects of the present invention.

Specifically, the ratio of the copolymer P in the resin C is preferably 98% by weight or more, and more preferably 99% by weight or more, and is preferably 100% by weight or less, and even more preferably, the resin C is composed only of the copolymer P.

The thermal softening temperature Td of the copolymer P is preferably 100° C. or higher, more preferably 110° C. or higher, still more preferably 115° C. or higher, and particularly preferably 120° C. or higher, and is preferably 155° C. or lower, more preferably 150° C. or lower, and particularly preferably 145° C. or lower. When the thermal softening temperature Td of the copolymer P is equal to or higher than the lower limit value of the foregoing range, a phase difference film having excellent heat resistance can be obtained. When the thermal softening temperature Td of the copolymer P is equal to or lower than the upper limit value of the above-described range, molding property of the resin can be improved, so that the phase difference film can be easily produced. Further, when the thermal softening temperature Td of the copolymer P falls within the above-described range, usually a phase difference film having desired optical properties can be particularly easily produced.

The thermal softening temperature Td of the copolymer P may be measured by thermomechanical analysis (TMA). Specifically, the thermal softening temperature Td may be measured by the method described in Examples.

The molecular weight of the copolymer P may be appropriately adjusted within a range in which a phase difference film having preferable optical properties can be obtained. The weight-average molecular weight Mw of the copolymer P may be within a range of, for example, 30,000 to 400,000. The weight-average molecular weight Mw may be measured as a polystyrene-equivalent value by gel permeation chromatography (GPC) using tetrahydrofuran as an eluent.

[1.2. Structure Included in Phase Difference Film and Properties Thereof]

The phase difference film includes a lamellar phase separation structure that generates the structural birefringence. The phase separation structure is formed in a layer of the resin C constituting the phase difference film. The phase separation structure in the resin C refers to a structure in which, as a result of self-organization of a portion constituted of the polymerization unit A (for example, block (A)) and a portion constituted of the polymerization unit B (for example, block (B)) of the copolymer P in the resin C, a phase having the polymerization unit A as a main component (also referred to as phase (A)) and a phase having the polymerization unit B as a main component (also referred to as phase (B)) are separated into distinguishable separate phases in the layer. In the following description, these phases may be simply referred to as "phase of polymerization unit A" and "phase of polymerization unit B". The term "lamellar phase separation structure" refers to a structure in which a layer-shaped phase (A) and a layer-shaped phase (B) are alternately stacked. The orientation layer having such a phase separation structure can generate the structural birefringence when the structure is sufficiently smaller than the wavelength of light.

The polymerization unit as a main component in a phase refers to a polymerization unit included by 50% by weight or more relative to the total weight of the polymerization units constituting the phase.

The polymerization unit A may preferably be contained in an amount of 80% by weight or more, more preferably 95% by weight or more, and still more preferably 99% by weight or more, and 100% by weight or less, relative to the total weight of the polymerization units constituting the phase (A). The polymerization unit B may preferably be contained in an amount of 80% by weight or more, more preferably 95% by weight or more, and still more preferably 99% by weight or more, and 100% by weight or less, relative to the total weight of the polymerization units constituting the phase (B).

When the copolymer P is a block copolymer having the block (A) having the polymerization unit A as a main component and the block (B) having the polymerization unit B as a main component, the phase (A) is usually constituted of the block (A), and the phase (B) is usually constituted of the block (B).

As exemplified by the phase separation structure, the structural birefringence is birefringence generated in a structure including a plurality of types of phases having different refractive indices. For example, when in a structure a phase having a refractive index of n2 exists in an inside of a phase having a refractive index of n1, the refractive index n2 being different from n1, such a structure can generate a structural birefringence. The structural birefringence is clearly different from the orientation birefringence generated by molecular orientation caused by stretching in that the birefringence is generated even when each phase is formed of an isotropic medium.

Whether the structural birefringence is actually generated may be confirmed by measuring the optical properties of the film. An unstretched film formed by a conventional method such as extrusion molding, press processing, or solvent casting usually has a random molecular orientation and thus has values of Re and Rth of close to almost zero. On the other hand, in an unstretched film in which the structural birefringence is generated, values of Re and Rth thereof are observed to be larger than those of the normal unstretched film formed by the conventional method. Thus, generation of the structural birefringence can be confirmed by measuring such values. Generation of the structural birefringence can be more surely confirmed by additionally performing structure observation using an electron microscope or small angle X-ray scattering.

In an embodiment, the phase difference film satisfies the following formula (1A) and formula (2).

$$f(A) > 0.5 \tag{1A}$$

$$D(A) > D(B) \tag{2}$$

In another embodiment, the phase difference film satisfies the following formula (1B) and formula (2).

$$f(B) > 0.5 \tag{1B}$$

Herein, "f(A)" represents the total weight ratio of the polymerization unit A in the copolymer P. "f(B)" represents the total weight ratio of the polymerization unit B in the copolymer P. The total weight ratio of the polymerization unit A in the copolymer P refers to a ratio of the total weight of the polymerization unit A included in the copolymer P relative to the weight of the copolymer P. The total weight ratio of the polymerization unit B in the copolymer P refers to a ratio of the total weight of the polymerization unit B included in the copolymer P relative to the weight of the copolymer P.

f(A) and f(B) may be determined by measuring the NMR spectrum of the copolymer P.

When the phase difference film satisfies the formula (1A), f(A) is usually more than 0.50, preferably 0.55 or more, and more preferably 0.60 or more, and is preferably 0.90 or less, more preferably less than 0.90 or less, further more preferably 0.85 or less, particularly preferably 0.82 or less, and the most preferably 0.80 or less.

When the phase difference film satisfies the formula (1B), f(B) is usually more than 0.50, preferably 0.55 or more, and more preferably 0.60 or more, and is preferably 0.90 or less, more preferably 0.85 or less, further more preferably 0.82 or less, and particularly preferably 0.80 or less.

Each of f(A) and f(B) may be adjusted by appropriately adjusting the material and the production operation for producing the copolymer P.

In the formula (2), D(A)=ReA(450)/ReA(550), and =ReB(450)/ReB(550).

The phase difference film of an embodiment satisfying the formula (1A) and formula (2) can have the reverse wavelength dispersion property (preferably the property satisfying Re(450)/Re(550)<1).

The phase difference film of another embodiment satisfying the formula (1B) and formula (2) can have the reverse wavelength dispersion property (preferably the property satisfying Rth(450)/Rth(550)<1).

Herein, ReA(450) represents an in-plane direction retardation (nm) of the film (A) formed from the polymer (A) composed of the polymerization unit A measured at a wavelength of 450 nm, ReA(550) represents an in-plane direction retardation (nm) of the film (A) measured at a wavelength of 550 nm, ReB(450) represents an in-plane direction retardation (nm) of the film (B) formed from the polymer (B) composed of the polymerization unit B measured at a wavelength of 450 nm, and ReB(550) represents an in-plane direction retardation (nm) of the film (B) measured at a wavelength of 550 nm.

The polymer (A) composed of the polymerization unit A may be obtained by polymerization of a monomer corresponding to the polymerization unit A, and further performing a reaction such as hydrogenation, if necessary.

The polymer (B) composed of the polymerization unit B may be obtained by polymerization of a monomer corresponding to the polymerization unit B, and further performing a reaction such as hydrogenation, if necessary. When the copolymer P has the block (A) and the block (B), the polymer (A) and the polymer (B) may be obtained in the same manner as in the producing methods of the block (A) and the block (B), respectively.

For example, the film (A) may be produced as follows. First, the polymer (A) is crushed into powders and the powders are placed between two polyimide films to form a layered body. The layered body is pressurized, and then the polyimide films are removed to produce a pressed film (A) having a thickness of 100 μm. The pressurizing conditions may be a temperature of 280° C., a pressure of 40 MPa, and a time period of 2 minutes. Subsequently, the pressed film (A) is uniaxially stretched at a ratio of 1.5 times to obtain a film (A).

For example, the film (B) may be produced as follows. First, the polymer (B) is crushed into powders and the powders are placed between two polyimide films to form a layered body. The layered body is pressurized, and then the polyimide films are removed to produce a pressed film (B) having a thickness of 100 μm. The pressurizing conditions may be a temperature of 25° C., a pressure of 20 MPa, and a time period of 2 minutes. Subsequently, the pressed film (B) is uniaxially stretched at a ratio of 3 times to obtain a film (B).

It is preferable that the phase difference film satisfies the following formula (3).

$$D(A) \geq 1.06 \tag{3}$$

D(A) is preferably 1.06 or more, more preferably 1.07 or more, and further preferably 1.08 or more, and may be 1.20 or less. When the range of D(A) is in the aforementioned range, the reverse wavelength dispersion property can be further effectively given to the phase difference film.

It is preferable that the phase difference film satisfies the following formula (4).

$$(D(A)-D(B)) \geq 0.04 \tag{4}$$

(D(A)−D(B)) is preferably 0.04 or more and more preferably 0.05 or more and may be 0.10 or less. When the range of (D(A)−D(B) is in the aforementioned range, the reverse wavelength dispersion property can be further effectively given to the phase difference film.

When the refractive index difference between the phase (A) and the phase (B) is larger, the structural birefringence can be generated more efficiently. Thus, an absolute value of the difference between the refractive index n(a) of the polymer (A) formed from the polymerization unit A and the refractive index n(b) of the polymer (B) formed from the polymerization unit B, (|n(a)−n(b)|), is preferably a large value, and it may be set to preferably 0.05 or more, more preferably 0.10 or more, and further more preferably 0.14 or more.

The refractive index n(a) may be obtained by producing the pressed film (A) from the polymer (A) as described above and measuring the refractive index of the pressed film (A). The refractive index n(b) may be obtained by producing the pressed film (B) from the polymer (B) as described above and measuring the refractive index of the pressed film (B).

It is preferable that the thickness of each of the phase (A) and phase (B) is 50 nm or less. When the phase (A) and the phase (B) in the lamellar phase separation structure have such a thin thickness, the phase separation structure can sufficiently generate the structural birefringence. The thickness of the phase (A) and the phase (B) may be larger than 0 nm, and may be, e.g., 10 nm or more.

The interphase distance in the lamellar phase separation structure is preferably 200 nm or less, more preferably 150 nm or less, and still more preferably 100 nm or less, and is greater than 0 nm, and, e.g., 10 nm or more. The term "interphase distance" refers to an interval between a lamella and another lamella (that is, the pitch of the repetition units of the lamella layers). As the interphase distance, a value obtained by fitting to a theoretical curve a scattering pattern obtained by the measurement of the small angle X-ray scattering may be adopted.

The interphase distance may be adjusted by adjusting the molecular structure of the copolymer P. For example, the adjustment may be performed by adopting a block copolymer as the copolymer P and appropriately adjusting factors such as a length of the blocks (A) and (B).

When the interphase distance and the thickness of the phases (A) and (B) in the phase separation structure are sufficiently smaller than the visible light as described above, the structural birefringence can be generated. In addition, coloration and light transmittance reduction of the film can thereby be prevented.

The in-plane direction retardation Re of the phase difference film may be freely set depending on the use application of the phase difference film. For example, when it is desired to give functions as a λ/4 plate to the phase difference film, the in-plane direction retardation Re of the phase difference film can be set to 120 nm to 160 nm. Further, for example, when it is desired to give functions as a λ/2 plate to the phase difference film, the in-plane direction retardation Re of the phase difference film can be set to 250 nm to 290 nm.

The thickness-direction retardation Rth of the phase difference film may be optionally set depending on the use application of the phase difference film. Specifically, the thickness-direction retardation Rth of the phase difference film is preferably −95 nm or more, more preferably −90 nm or more, and particularly preferably −85 nm or more, and is preferably 180 nm or less, more preferably 170 nm or less, and particularly preferably 160 nm or less.

The birefringence Δn of the phase difference film may be optionally set depending on the use application of the phase difference film. Specifically, the birefringence Δn of the phase difference film may be preferably 0.0001 or more, more preferably 0.0002 or more, and particularly preferably 0.0003 or more, and is preferably 0.0021 or less, more preferably 0.002 or less, and particularly preferably 0.0019 or less. The birefringence Δn is obtained by dividing the in-plane direction retardation Re by the thickness d.

The NZ factor of the phase difference film may be optionally set depending on the use application of the phase difference film. Specifically, the NZ factor of the phase difference film is preferably more than −0.5, more preferably −0.1 or more, and particularly preferably 0 or more, and is preferably less than 2.0, more preferably 1.8 or less, and particularly preferably 1.7 or less.

The thickness of the phase difference film may be optionally set depending on the use application of the phase difference film. Specifically, the thickness of the phase difference film is preferably 5 µm or more, more preferably 10 µm or more, and particularly preferably 15 µm or more, and is preferably 270 µm or less, more preferably 260 µm or less, and particularly preferably 250 µm or less.

In an embodiment, it is preferable that the phase difference film has an in-plane direction retardation Re(550) measured at a wavelength of 550 nm is 0 nm or more and 10 nm or less. As to the phase difference film, the thickness-direction retardation Rth(550) measured at a wavelength of 550 nm is preferably 80 nm or more, more preferably 90 nm or more, and further more preferably 100 nm or more. The larger the thickness-direction retardation Rth(550) is, the more preferable it is, but it can be set to 300 nm or less. It is preferable that the phase difference film has a property that is analogous to a negative C plate. By having such a property, a combination of the phase difference film with, e.g., a negative A plate can suppress light leakage of a liquid crystal display device in the front direction and the tilted direction and color shift of the liquid crystal display device observed from the front direction and the tilted direction. The negative C plate herein refers to a film having refractive indices nx, ny and nz thereof in a relationship of nx=ny>nz. The negative A plate herein refers to a film having refractive indices nx, ny and nz thereof in a relationship of nx<ny=nz.

The ratio (Rth(450)/Rth(550)) of the thickness-direction retardation Rth(450) of the phase difference film measured at a wavelength of 450 nm relative to the thickness-direction retardation Rth(550) of the phase difference film measured at a wavelength of 550 nm is preferably 0 or more, and more preferably 0.75 or more, and is preferably less than 1, and more preferably 0.95 or less. The ratio (Rth(450)/Rth(550)) is preferably 0 or more and less than 1, and more preferably 0.75 or more and 0.95 or less. When the ratio (Rth(450)/Rth(550)) falls within the aforementioned range, it is possible to suppress a large change in the optical properties of the phase difference film depending on the wavelength of light to be transmitted.

[1.3. Method for Producing Phase Difference Film]

The phase difference film may be produced from the resin C by any of the methods that are publicly known in prior art. Examples of the production method may include extrusion molding method, press processing method, and solvent casting method.

[1.3.1. Press Processing Method]

Among them, preferable is the press processing method from the viewpoint of facilitating generation of lamellar phase separation structure. The press processing method is particularly preferably employed for producing a phase difference film satisfying f(B)>0.5.

The conditions for the press processing method may be appropriately selected in conformity with the properties of the resin C, such as the thermal softening temperature, the decomposition temperature, and the phase transition temperature. The temperature for the press processing is preferably 200° C. or more, more preferably 210° C. or more, and further preferably 230° C. or more, and is preferably 300° C. or less, more preferably 290° C. or less, and further preferably 280° C. or less. The pressure for the press processing is preferably 10 MPa or more, more preferably 20 MPa or more, and further preferably 30 MPa or more, and is preferably 100 MPa or less, more preferably 90 MPa or less, and further preferably 80 MPa or less. The pressing time for the press processing is preferably 60 seconds or more, more preferably 90 seconds or more, and further preferably 120 seconds or more, and is preferably 300 seconds or less, more preferably 240 seconds or less, and further preferably 180 seconds or less.

An example of processing of the resin C by the press processing is as follows. Firstly, powders of the resin C are placed between a pair of heat durable films (such as polyimide films) to form a layered body. The layered body is then pressurized while heating by a processing device such as an electric heating pressurizing device. After the completion of the pressurization, the pressure is released and the layered body is cooled to the room temperature, and the pair of the films are removed, to thereby obtain the phase difference film.

[1.3.2. Extrusion Molding Method]

Alternatively, production by the following production method is also preferable from the viewpoint of facilitating generation of lamellar phase separation structure. The following production method is particularly preferably employed for producing a phase difference film satisfying f(A)>0.5.

In the method for producing a phase difference film according to an embodiment of the present invention, the phase difference film is produced using the resin C. The producing method includes a first step of performing melt extrusion of the resin C onto a cooling roll to obtain an intermediate film, and a second step of subjecting the intermediate film to a stretching treatment.

FIG. 1 is a schematic diagram schematically illustrating a scheme of producing a phase difference film 10 by a producing method according to an embodiment of the present invention. In FIG. 1, an example using a die 110 as a mold, an extrusion molding apparatus 100 including a cooling roll 120 provided to be rotatable in the circumferential direction, and a stretching apparatus 200 to produce a long-length phase difference film 1 0 will be described. However, the present invention is not limited to the example illustrated in FIG. 1.

As in the example illustrated in FIG. 1, in the first step, a resin 20 as the resin C in a molten state is usually extruded from the die 110 onto the cooling roll 120 into a film shape. The resin 20 extruded from the die 110 is received by the cooling roll 120 which rotates in the circumferential direction, and cooled. Upon cooling, the resin 20 is cured to obtain an intermediate film 30.

The obtained intermediate film 30 is conveyed by the rotation of the cooling roll 120, and is sent to the stretching apparatus 200 to be subjected to the second step.

In the second step, the intermediate film 30 is subjected to a stretching treatment. Since the copolymer P included in the intermediate film 30 is oriented by the stretching treatment, the phase difference film 1 0 having a desired retardation is obtained. The producing method of this embodiment is performed so as to satisfy the following requirement 1.

Requirement 1: The thermal softening temperature Td of the copolymer P and the temperature Tc of the cooling roll 120 satisfy the following formula (5).

$$Tc < Td - 50° \text{ C.} \tag{5}$$

The producing method of this embodiment may, in addition to the requirement 1, satisfy the aforementioned formula (1A) (f(A)>0.5).

The producing method of this embodiment may, in addition to the requirement 1, satisfy the following formula (1A-2).

$$0.5 < f(A) \leq 0.85 \tag{1A-2}$$

The producing method of another embodiment may, in addition to the requirement 1, satisfy the aforementioned formula (1B) (f(B)>0.5). The producing method of another embodiment may, in addition to the requirement 1, satisfy the following formula (1B-2).

$$0.5 < f(B) \leq 0.85 \tag{1B-2}$$

The first step and the second step will be described in more detail.

(First Step (Melt Extrusion))

In the first step, melt extrusion of the resin C containing the copolymer P onto a cooling roll is performed to obtain an intermediate film.

Usually, the molten resin C is supplied to a die such as a T die and extruded using an extruder such as a twin screw extruder. The molten resin C is continuously molded into a film shape by extrusion from the die. In the following description, the resin C in the molten state molded in this manner is sometimes referred to as a "molten resin film" focusing on its shape.

The extrusion temperature Te of the resin C in the first step is preferably Td+110° C. or higher, more preferably Td+115° C. or higher, and particularly preferably Td+120° C. or higher, and is preferably Td+170° C. or lower, more preferably Td+165° C. or lower, and particularly preferably Td+160° C. or lower. The Td represents the thermal softening temperature of the copolymer P. When the extrusion temperature Te falls within the above-described range, the phase difference film having desired optical properties can be particularly easily produced. Usually, molding of the resin C can be smoothly performed when the extrusion temperature Te is equal to or higher than the lower limit value of the above-described range, and degradation of the resin can be suppressed when the extrusion temperature Te is equal to or lower than the upper limit value. The extrusion temperature Te of the resin C is the temperature of the resin C at the time of extrusion from the mold, and usually corresponds to the temperature at the lip of the die.

The molten resin film as the molded resin C is continuously guided to the cooling roll and received by the peripheral surface of the cooling roll. Usually, the cooling roll is rotated in the circumferential direction about its axis of rotation. Therefore, the molten resin film is conveyed along the conveying path on the peripheral surface of the cooling roll and simultaneously cooled. Although a part of heat of the resin C is dissipated into the surrounding air, almost all thereof is transferred to the cooling roll, whereby the cooling of the resin C is achieved. Then, the resin C is cured by such cooling, so that the intermediate film formed of the resin C is obtained.

In the first step according to the present embodiment, the temperature Tc of the cooling roll satisfies the above-described formula (5). Herein, the temperature Tc of the cooling roll represents the temperature of the peripheral surface of the cooling roll. More particularly, the temperature difference Td−Tc between the temperature Tc of the cooling roll and the thermal softening temperature Td of the copolymer P is usually higher than 50° C., preferably higher than 50.2° C., and particularly preferably higher than 50.5° C. If the temperature difference Td−Tc is higher than the above-described lower limit value, it is possible to easily perform the production of the phase difference film having a reverse wavelength dispersion property. Furthermore, usually, when the temperature difference Td−Tc is higher than the above-described lower limit value, the optical properties other than the wavelength dispersion property of the phase difference film can also be easily adjusted to a desired value. The upper limit of the temperature difference Td−Tc is not particularly limited, and is preferably lower than 100° C., more preferably lower than 95° C., and particularly preferably lower than 90° C. When the temperature difference Td−Tc is lower than the above-described upper limit, control of the temperature of the cooling roll is facilitated, so that it is possible to easily perform the production of the phase difference film having a reverse wavelength dispersion property.

In an embodiment, the time period for keeping the resin C in a molten state is preferably 1 minute or more, and more preferably 3 minutes or more, and is preferably 30 minutes or less, and more preferably 20 minutes or less.

In an embodiment, the temperature Tc of the cooling roll is preferably Td−70° C. or more, and more preferably Td−50° C. or more, and is preferably Td+5° C. or less, and more preferably Td or less.

It is deduced that a structural birefringence by the lamellar phase separation structure is generated in a phase difference film produced by a process wherein, in the melt extrusion step, the time period for keeping the resin C in a molten state is 10 minutes, and temperature Tc of the cooling roll is 120° C.

The surface on the cooling roll side of the molten resin film received on the cooling roll as described above may be in contact with the peripheral surface of the cooling roll or may be apart therefrom. For example, by an air layer formed between the surface of the molten resin film and the peripheral surface of the cooling roll, the surface of the molten resin film and the peripheral surface of the cooling roll may be apart from each other. When an air layer is formed, the molten resin film is supported by the cooling roll through the air layer. Even in this case, however, as the air layer is thin, the molten resin film is cooled by the cooling roll. When an air layer is formed, pinning of the molten resin film may usually be effected at portions of its width direction (for example, at its ends in the width direction) to be in contact with the peripheral surface of the cooling roll, and the rest portions thereof may be apart from the peripheral surface of the cooling roll at other portions. The pinning may be performed by, for example, electrostatic pinning, air pinning, pinning with a roller, or the like.

The thickness of the intermediate film obtained in the first step may be appropriately set depending on the optical properties of the phase difference film to be produced. Specifically, the thickness of the intermediate film is preferably 10 μm or more, more preferably 20 μm or more, and particularly preferably 30 μm or more, and is preferably 300 μm or less, more preferably 290 μm or less, and particularly preferably 280 μm or less.

(Second Step (Stretching Treatment))

In the second step, the intermediate film obtained in the first step is subjected to a stretching treatment. By this stretching treatment, optical properties such as retardation are exhibited, so that a phase difference film is obtained.

The stretching treatment is usually performed by a flat stretching method in which the intermediate film is stretched in the in-plane direction. Examples of the flat stretching method may include a uniaxial stretching method and a biaxial stretching method. The uniaxial stretching method is a stretching method in which the intermediate film is stretched in one direction within its plane. Examples of the uniaxial stretching method may include a free-width uniaxial stretching method and a constant-width uniaxial stretching method. The biaxial stretching method is a stretching method in which the intermediate film is stretched in two directions within its plane. Examples of the biaxial stretching method may include a sequential biaxial stretching method and a simultaneous biaxial stretching method. In the biaxial stretching method, the stretching in each direction may be free width stretching or may be constant width stretching. More specific examples of the sequential biaxial stretching method may include a full tenter method and a roll tenter method.

The stretching temperature $T_E$ of the stretching treatment in the second step may be appropriately set depending on the optical properties of the phase difference film to be produced. The specific stretching temperature $T_E$ is preferably Td or higher, more preferably Td+1° C. or higher, and particularly preferably Td+2° C. or higher, and is preferably Td+20° C. or lower, more preferably Td+19° C. or lower, and particularly preferably Td+18° C. or lower. The Td represents the thermal softening temperature of the copolymer P. When the stretching temperature $T_E$ is equal to or higher than the lower limit value of the above-described range, the stretching treatment can be smoothly performed. When the stretching temperature $T_E$ is equal to or lower than the upper limit value of the above-described range, desired optical properties can be easily exhibited in the phase difference film by the stretching treatment.

The stretching ratio in the stretching treatment of the second step may be appropriately set in accordance with the optical properties of the phase difference film to be produced. The specific stretching ratio is preferably 1.1 times or more, more preferably 1.2 times or more, and particularly preferably 1.3 times or more, and is preferably 5.0 times or less, more preferably 4.9 times or less, and particularly preferably 4.8 times or less. When the stretching ratio falls within the above-described range, the phase difference film having desired optical properties can be particularly easily produced. When the stretching ratio is in such a range, a phase difference film applicable to a wide range of use applications such as a λ/4 plate and a λ/2 plate can be obtained.

When the stretching direction in the second step includes two or more directions, the stretching ratio represents the total stretching ratio obtained by multiplying the stretching ratios in respective directions.

The stretching treatment may be performed on a line continuous with the production line of the intermediate film. Alternatively, the intermediate film may be temporarily wound into a take-up film roll, and thereafter, the intermediate film may be unwound from the film roll and subjected to a stretching treatment.

(Optional Step)

In the method for producing the phase difference film, an optional step may be further performed in combination with the first step and the second step described above. Examples of the optional step may include a trimming step of removing the end portions in the width direction of the intermediate film or the phase difference film; a collecting step of collecting the phase difference film by winding; and a step of forming an optional layer on the phase difference film.

According to the producing method described above, a phase difference film having a reverse wavelength dispersion property can be easily obtained. In an embodiment, the in-plane direction retardations Re(450) and Re(550) of the phase difference film at the measurement wavelengths of 450 nm and 550 nm preferably satisfy Re(450)<Re(550), and more preferably satisfy the following formula (6).

$$0.70 \leq Re(450)/Re(550) \leq 0.95 \tag{6}$$

More specifically, Re(450)/Re(550) is preferably 0.70 or more, more preferably 0.71 or more, and particularly preferably 0.72 or more, and is preferably 0.95 or less, more preferably 0.94 or less, and particularly preferably 0.93 or less.

Further, in an embodiment, the in-plane direction retardations Re(550) and Re(650) of the phase difference film at the measurement wavelengths of 550 nm and 650 nm preferably satisfy Re(550)<Re(650), and more preferably satisfy the following formula (7).

$$1.02 \leq Re(650)/Re(550) \leq 1.20 \tag{7}$$

More specifically, Re(650)/Re(550) is preferably 1.02 or more, and more preferably 1.03 or more, and is preferably 1.20 or less, and more preferably 1.19 or less.

The phase difference film having a reverse wavelength dispersion property as described above can exhibit its optical function in a wide wavelength range. For example, a phase difference film that can function as a λ/4 plate at a certain wavelength can function as a λ/4 plate in a wide wavelength range including that wavelength. Therefore, when the phase difference film is provided to the image display device, it is possible to improve the display characteristics of the image display device.

[2. Use Application]

The phase difference film of the present embodiment may be used as a component of a display device such as a liquid crystal display device or an organic electroluminescent display device.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

Example A1, Comparative Example A1, and Reference Example A2

[Evaluation Method]

Method for Measuring Thermal Softening Temperature

The resin to be measured was molded into a film of 5 mm×20 mm×100 μm to prepare a sample. This sample was subjected to TMA (thermomechanical analysis) measurement using a thermomechanical analyzer ("TMA/SS7100" manufactured by SII NanoTechnology Inc.) to measure the thermal softening temperature. Specifically, the temperature was changed from 20° C. to 180° C. at a rate of 5° C./min while the sample was applied with a tension of 50 mN in its lengthwise direction. The temperature when the length of the sample changed by 3% was determined as the thermal softening temperature.

(Retardation of Film)

The retardation of the film was measured using a phase difference measurement device ("KOBRA-21-ADH" manufactured by Oji Scientific Instruments).

(Phase Separation Structure)

The film was cut to a size of 2 mm×4 mm and 30 sheets of the cut film were stacked in the thickness direction and fixed to a folder, and the scattering pattern thereof was obtained using a small angle X-ray scattering measurement facility (Aichi S R, beam line 8S3) under conditions of a camera length of 4 m, an X-ray energy of 8.2 KeV, a measurement q range of about 0.06 to 3 nm$^{-1}$, and an exposure time per sample of 60 seconds. The obtained scattering pattern was fitted with a theoretical curve to determine the phase separation structure and thereby calculate the thickness of each layer and the interphase distance.

The X-ray irradiation surface was set to a cross section of the film, and the integration range was set to 20° both in the thickness direction and the direction perpendicular to the thickness direction. The interphase distance was calculated from the data obtained from each integration operation, and the average values of the interphase distance in the thickness direction and the direction perpendicular to the thickness direction and the average value of the thickness of each phase were adopted as the measurement values.

(Measurement of Re(450)/Re(550))
(Measurement of D(A))
(Production of Polymer (A))

To a dry pressure-resistant reaction vessel, in which an internal atmosphere had been replaced with a nitrogen gas, 500 mL of toluene as a solvent and 0.29 mmol of n-butyllithium as a polymerization catalyst were placed, followed by addition of 7.0 g of 2-vinylnaphthalene as a monomer (a), and the resulting mixture was reacted at 25° C. for 1 hour, thereby performing a polymerization reaction. The reaction mixture was poured into a large quantity of 2-propanol to precipitate and collect the polymer. The obtained polymer was measured by gel permeation chromatography (GPC) to find that the weight-average molecular weight (Mw) was 100,000. The thermal softening temperature of the polymer measured by thermomechanical analysis apparatus (TMA) was 145° C.

(Production of Pressed Film (A))

The obtained polymer was crushed into powders by a crushing machine. The powders thus obtained were placed between a pair of polyimide films (each having a thickness of 100 μm) to form a layered body and the layered body was pressurized. The pressurization was performed using an electric heating pressurizing device. The pressurization was performed under conditions of a temperature of 280° C., a pressure of 40 MPa, and a pressurizing time of 2 minutes. After completing the pressurization, the pressure was released and the layered body was cooled to the room temperature in the air. Then, the polyimide films were removed. By these operations, an unstretched pressed film (A) having a thickness of 100 μm was produced.

(Production of Film (A))

The pressed film (A) thus produced was uniaxially stretched at a ratio of 1.5 times using a heating-type tensile testing machine under the conditions of a chuck interval of 80 mm, a stretching speed of 100%/min, and a temperature of 155° C. to obtain a stretched film (film (A)). The in-plane direction retardation Re(550) of the film (A) measured at a wavelength of 550 nm was 140 nm. Further, the value (D(A)) of Re(450)/Re(550) of the film (A) was 1.08.

(1. Measurement of D(B) of Butadiene Homopolymer)
(Production of Polymer (B1))

In a dry pressure-resistant reaction vessel, in which an internal atmosphere had been replaced with nitrogen, 100 mL of toluene as a solvent and 270 μL (0.43 mmol) of hexane solution containing 1.6M of n-butyllithium as a polymerization catalyst were placed. Then, 64 g of a toluene solution containing 25 wt % of butadiene as the monomer (b) was added thereto, and the resulting mixture was reacted at 50° C. for 1 hour, to thereby obtain a polymer. The GPC measurement revealed that the polymer had the number-average molecular weight (Mn) of 80,000, the weight-average molecular weight (Mw) of 85,000, and the molecular weight distribution of 1.06. On the basis of the ratio of integrated values of olefin portions of the $^1$H-NMR measurement, it was confirmed that the polymer was constituted of 89% of poly(1,4-butadiene) and 11% of poly(1,2-butadiene).

The polymer thus obtained was concentrated, and, after toluene was removed, the concentrated product was dissolved in 700 mL of p-xylene. To this solution, 55 g of p-toluenesulfonyl hydrazide was added, and, after oxygen in the solution was removed by repeatedly performing a combination of pressure reduction and nitrogen substitution operations, the solution was allowed to react at a temperature of 120° C. for 6 hours. By this reaction, double bonds derived from butadiene were hydrogenated. After completing the hydrogenation, a large quantity of acetone and methanol were poured to the reaction solution to obtain a hydrogenated polymer (polymer (B1)) as 40 g of a massive product. The hydrogenated polymer thus obtained was analyzed by NMR. As a result the hydrogenation ratio was larger than 99%.
(Production of Pressed Film (B1))

A mass of the hydrogenated polymer obtained as the polymer (B1) in an amount of 2 g was placed between a pair of polyimide films (each having a thickness of 100 μm) to form a layered body and the layered body was pressurized. The pressurization was performed using the electric heating pressurizing device. The pressurization was performed under conditions of a temperature of 25° C., a pressure of 20 MPa, and a pressurizing time of 2 minutes. After completing the pressurization, the pressure was released and the polyimide films were removed. By these operations, an unstretched pressed film (B1) having a thickness of 100 μm was produced.
(Production of Film (B1))

The pressed film (B1) thus produced was uniaxially stretched at a ratio of 3 times using the heating-type tensile testing machine under the conditions of a chuck interval of 80 mm, a stretching speed of 100%/min, and a temperature of 25° C. to obtain a stretched film (film (B1)). The in-plane direction retardation Re(550) of the film (B1) measured at a wavelength of 550 nm was 140 nm. Further, the value (D(B1)) of Re(450)/Re(550) of the film (B1) was 1.03.
(2. Measurement of D(B) of Isoprene Homopolymer)
(Production of Polymer (B2))

In a dry pressure-resistant reaction vessel, in which an internal atmosphere had been replaced with a nitrogen gas, 500 mL of toluene as a solvent and 0.29 mmol of n-butyllithium as a polymerization catalyst were placed. Then, 21 g of isoprene as a monomer (b) was added and the resulting mixture was further reacted at 25° C. for 1 hour, thereby performing polymerization. The reaction mixture was poured into a large quantity of 2-propanol to precipitate and collect the polymer.

The polymer thus obtained was dissolved in 700 mL of p-xylene to prepare a solution. To this solution, 7.6 g of p-toluenesulfonyl hydrazide was added, and the resulting mixture was reacted at a temperature of 130° C. for 8 hours. By this reaction, double bonds derived from isoprene were hydrogenated. After completing the hydrogenation, the reaction solution was poured into a large quantity of 2-propanol to obtain 20 g of a massive hydrogenated polymer. The hydrogenated polymer thus obtained was measured by gel permeation chromatography (GPC) to find that the weight-average molecular weight was 100,000.
(Production of Pressed Film (B2))

A pressed film (B2) that is an unstretched film having a thickness of 100 μm was produced by the same manner as the production of the pressed film (B1) except that the hydrogenated polymer as the polymer (B2) obtained in the above was used in place of the polymer (B1).
(Production of Film (B2))

A stretched film (film (B2)) was obtained by the same manner as the production of the film (B1) except that the pressed film (B2) produced in the above was used in place of the pressed film (B1). The in-plane direction retardation Re(550) of the film (B2) measured at a wavelength of 550 nm was 140 nm. Further, the value (D(B2)) of Re(450)/Re(550) of the film (B2) was 1.03.
(Refractive Index)

The refractive index of the pressed film (A) and the pressed film (B1) described above was measured at a wavelength of 550 nm using an ellipsometer "M-2000U" manufactured by J. A. Woollam Japan. The refractive index (n(a)) of the pressed film (A) was 1.67. The refractive index (n(b1)) of the pressed film (B1) was 1.53, while the refractive index (n(b2)) of the pressed film (B2) was 1.52.
(Display Performance of Liquid Crystal Display Device)
(Production of Negative A Plate)

By co-extrusion molding, a long-length unstretched layered body film having layer<1> (15 μm)—layer<3> (5 μm)—layer<2> (100 μm)—layer <3> (5 μm)—layer <1> (15 μm) in this order was obtained. Herein, the layer <1> is composed of a norbornene-based polymer (ZEON Corporation, ZEONOR 1020, glass transition temperature 105° C.).

The layer <2> is composed of a styrene-maleic anhydride copolymer (Nova Chemicals Japan, Dylark D332, glass transition temperature 130° C., oligomer content 3 wt %). The layer <3> is composed of a modified ethylene-vinyl acetate copolymer (Mitsubishi Chemical, Modic APA543, Vicat softening temperature 80° C.).

Subsequently, the long-length unstretched layered body film obtained in the above was passed through a heating zone over 30 seconds, the film temperature therein being set to 140° C. Then the film was stretched in its lengthwise direction at a ratio of 1.50 times, to thereby obtain a stretched film having a thickness of 114 μm.

As to the stretched film thus obtained, the in-plane direction retardation Re(550) and thickness-direction retardation Rth(550) at the wavelength of 550 nm were measured by the aforementioned method. Re(550) was 150 nm, Rth(550) was −75 nm, the in-plane slow axis was orthogonal to the lengthwise direction, and the fluctuation thereof were ±0.05°. The containing ratio of the residual volatile ingredient was 0.01 wt % or less. That is, the stretched film thus obtained was a negative A plate having an in-plane slow axis being orthogonal to the lengthwise direction.
(Production of View Side Polarizing Plate)

A polarizer was produced by subjecting a stretched polyvinyl alcohol film to iodine adsorption. Subsequently, the phase difference film to be evaluated was bonded to one surface of the polarizer using a polyvinyl alcohol-based adhesive. Then the stretched film produced in the above (negative A plate) was bonded to the surface of the phase difference film to be evaluated using an adhesive. Upon this bonding, disposal was effected such that the absorption axis of the polarizer and the slow axis of the phase difference film were in an orthogonal relationship. A cellulose triacetate film having a thickness of 80 μm (manufactured by Fuji Film Corporation, "TD-80UF") was prepared, and saponification treatment was performed on one side surface thereof. Subsequently, the back surface (the surface on which the phase difference film was not bonded) of the polarizer and the saponified surface of the cellulose triacetate film was bonded using a polyvinyl alcohol-based adhesive, to produce a view side polarization plate (P1).
(Production of Backlight-Side Polarizing Plate)

A polarizer was produced by subjecting a stretched polyvinyl alcohol film to iodine adsorption. A commercially available cellulose acetate film 1 (manufactured by Fuji Film Corporation, "Z-TAC") was prepared, and subjected to saponification treatment. Subsequently, to one side surface of the polarizer, the cellulose acetate film 1 was bonded using a polyvinyl alcohol-based adhesive. A commercially available cellulose triacetate film 2 (manufactured by Fuji Film Corporation, "Fujitac TD80UF") was prepared, and subjected to saponification treatment. Subsequently, to the other side surface of the polarizer, the saponified cellulose triacetate film 2 was bonded using a polyvinyl alcohol-based adhesive. The bonded product was then dried at 70° C. for 10 minutes or more, to thereby produce a polarization plate (P2).

(Production of IPS Mode Liquid Crystal Display Device)

From a liquid crystal television set of IPS mode (manufactured by Matsushita Electric Industrial Co., Ltd., "TH-32LX500"), the liquid crystal cell was taken out, and the polarizing plates and the optical films bonded on the view side and the backlight side thereof was peeled off. Upon being in the state of absent of electric voltage application and the state of displaying black color, the liquid crystal compound molecules in this liquid crystal cell were oriented in a substantially parallel direction between the glass substrates and the slow axis direction thereof was in horizontal direction with respect to the display surface. On the glass substrates of upper and lower side of the aforementioned parallel-oriented cell, the polarization plate (P1) produced as the view side polarizing plate and the polarization plate (P2) produced as the backlight side polarizing plate were bonded using a tacky agent. The polarizing plate (P1) was bonded in a manner such that the phase difference film to be evaluated was contacted to the liquid crystal cell glass plate. The polarization plate (P2) was bonded in a manner such that the cellulose triacetate film 1 (Z-TAC film) was contacted to the liquid crystal cell glass plate. Disposal was made such that the absorption axis of the polarization plate (P1) and the slow axis of the liquid crystal cell were in orthogonal relationship, and that the absorption axes of the polarizing plate (P1) and the polarizing plate (P2) were in orthogonal relationship. The liquid crystal cell, to which the polarizing plates were bonded in this manner, were again incorporated into the liquid crystal television set, to thereby produce a liquid crystal display device for display performance evaluation.

(Evaluation of Display Performance)

The liquid crystal display device produced in the above was visually observed from the front direction and the tilted direction, to thereby evaluate light leakage and color shift.

Example A1

(Production of Copolymer P)

In a dry pressure-resistant reaction vessel, in which an internal atmosphere had been replaced with nitrogen, 100 mL of toluene as a solvent and 270 µL (0.43 mmol) of hexane solution containing 1.6M of n-butyllithium as a polymerization catalyst were placed. Then, 10 g of a toluene solution containing 25 wt % of 2-vinylnaphthalene (aromatic vinyl-based compound) as the monomer (a) was added to the pressure-resistant reaction vessel, and the resulting mixture was reacted at 25° C. for 1 hour, thereby performing a polymerization reaction of a first stage. After completing the polymerization reaction of the first stage, a portion of the polymer was collected and subjected to a measurement of the molecular weight by GPC using tetrahydrofuran as a solvent to confirm that the polymer had the number-average molecular weight (Mn) of 18,300, the weight-average molecular weight (Mw) of 19,700, and the molecular weight distribution of 1.08.

Subsequently, to the reaction mixture in the heat-resistant reaction vessel, 40 g of a toluene solution containing 25 wt % of butadiene (chain conjugated diene-based compound) as the monomer (b) was added, and the resulting mixture was reacted at 50° C. for 1 hours, thereby performing a polymerization reaction of a second stage. As a result, a diblock copolymer having a block configuration of (2-vinylnaphthalene block)—(butadiene block) was obtained in the reaction mixture. The GPC measurement revealed that the diblock copolymer had the number-average molecular weight (Mn) of 45,200, the weight-average molecular weight (Mw) of 47,900, and the molecular weight distribution of 1.06. Further, on the basis of the ratio of integrated values of olefin portions, the butadiene block was constituted of 89% of poly(1,4-butadiene) and 11% of poly(1,2-butadiene).

Subsequently, to the reaction mixture, 10 g of a toluene solution containing 25 wt % of 2-vinylnaphthalene as the monomer (a) was added, and the resulting mixture was reacted at 25° C. for 17 hours, thereby performing a polymerization reaction of a third stage. After completing the polymerization reaction, 100 µL of methanol was added to obtain a reaction mixture containing a triblock copolymer having a block configuration of (2-vinylnaphthalene block)—(butadiene block)—(2-vinylnaphthalene block). A portion of the triblock copolymer was collected and subjected to a measurement of the molecular weight by GPC. As a result it was confirmed that the triblock copolymer had the number-average molecular weight (Mn) of 45,000, the weight-average molecular weight (Mw) of 55,000, and the molecular weight distribution of 1.06. Further, the $^1$H-NMR measurement confirmed that 2-vinylnaphthalene added in the third stage were all consumed.

The triblock copolymer thus obtained was concentrated, and, after toluene was removed, the concentrated product was dissolved in 700 ml of p-xylene. To this solution, 55 g of p-toluenesulfonyl hydrazide was added, and, after oxygen in the solution was removed by repeatedly performing a combination of pressure reduction and nitrogen substitution operations, the solution was allowed to react at a temperature of 120° C. for 6 hours. By this reaction, double bonds of the butadiene block were hydrogenated. After completing the hydrogenation, a large quantity of acetone and methanol were poured to the reaction solution to obtain a hydrogenated block copolymer as 20 g of a massive product. The hydrogenated block copolymer thus obtained had a triblock configuration of "polymer block [A]"—"polymer block [B]"—"polymer block [A]". The polymer block [A] includes the 2-vinylnaphthalene unit as the polymerization unit A. The polymer block [B] includes the hydrogenated butadiene unit as the polymerization unit B.

The hydrogenated block copolymer (copolymer P) thus obtained was analyzed by $^1$H-NMR. As a result, the weight ratio of the 2-vinylnaphthalene unit and the hydrogenated butadiene unit in the hydrogenated block copolymer was 33:67. Thus, the weight fraction wA of the polymerization unit A was 0.33, and the weight fraction wB of the polymerization unit B was 0.67. Further, the hydrogenation ratio of the butadiene unit in the hydrogenated block copolymer was >99%. The thermal softening temperature Td of the hydrogenated block copolymer measured by thermomechanical analysis apparatus (TMA) was 103° C.

(Production of Phase Difference Film)

The triblock copolymer obtained in the aforementioned section (Production of triblock copolymer P) was used as the resin C. The resin C was crushed into powders by a crushing machine. The powders thus obtained were placed between a pair of polyimide films (each having a thickness of 100 µm) to form a layered body and the layered body was pressurized. The pressurization was performed using an electric heating pressurizing device. The pressurization was performed under conditions of a temperature of 290° C., a pressure of 40 MPa, and a pressurizing time of 5 minutes. After completing the pressurization, the pressure was released and the layered body was cooled to the room temperature in the air. Then, the polyimide films were removed. By these operations, a phase difference film 1 having a thickness of 75 µm was produced.

When the phase difference film 1 thus obtained was observed by a small angle scattering method in which an X-ray was made incident on the cross section of the film by the aforementioned method, a lamellar structure having an interphase distance of 40 nm and a thickness of the phase of 20 nm was observed. A slice of a cross section that is parallel to the thickness direction was prepared and observed by TEM, and thereby a lamellar phase separation structure was confirmed.

The in-plane direction retardation Re(550) and the thickness-direction direction retardation Rth(550) of the obtained phase difference film 1 were measured at a wavelength of 550 mm. As a result, Re(550)=4 nm and Rth(550)=90 nm, and therefore a property that is analogous to a negative C plate was obtained by the structural birefringence. It was also confirmed that Rth(450)/Rth(550)=0.80<1, and therefore the phase difference film 1 has a reverse wavelength dispersion property.

The phase difference film 1 thus obtained was installed in a liquid crystal display device in accordance with the aforementioned procedure, and display performance of the liquid crystal display device was evaluated. As a result, light leakage was kept at a low level and color shift was suppressed in both the front direction and the tilted direction.

Comparative Example A1

A cycloolefin resin "ZEONOR 1020" manufactured by ZEON Corporation was prepared. Using an extrusion machine, this resin was melted at a resin temperature of 260° C. and extruded from a die having a width of 400 mm on a casting drum having a surface temperature of 90° C. to be in a sheet form, to obtain an unstretched film having a thickness of 100 µm. The unstretched film thus obtained was stretched in the flow direction using a float-type longitudinal stretching machine at a stretching ratio of 1.5 times at 110° C., and further stretched in a width direction using a tenter at a stretching ratio of 1.4 times at 110° C., to obtain a phase difference film C1 having a thickness of 58 µm.

When the phase difference film C1 thus obtained was observed by a small angle scattering method in which an X-ray was made incident on the cross section of the film by the aforementioned method, an apparent peak was not obtained, and therefore no phase separation structure was confirmed.

The in-plane direction retardation Re(550) and the thickness-direction direction retardation Rth(550) of the obtained phase difference film C1 were measured at a wavelength of 550 mm. As a result, Re(550)=3 nm and Rth(550)=90 nm, and therefore this film had a property that is analogous to a negative C plate. As to the phase difference film C1, Re(450)/Re(550)=1.02>1, and therefore the phase difference film C1 exhibited a weak forward wavelength dispersion property.

The phase difference film C1 thus obtained was installed in a liquid crystal display device in accordance with the aforementioned procedure, and display performance of the liquid crystal display device was evaluated. As a result, color shift of the observation from the front direction and the tilted direction was inferior to that of Example A1.

Reference Example A2

In Example A1, the amount of butadiene to be added in the second stage of the polymerization was modified, to thereby obtain a block copolymer having a weight ratio of 2-vinylnaphthalene:butadiene of 67:33 (that is, the weight fraction wA=0.67 and the weight fraction wB=0.33). The glass transition temperature of the block copolymer thus obtained was 123° C. Except that this block copolymer was used in place of the resin C, production was performed by the same manner as (Production of phase difference film) of Example A1, to thereby obtain a phase difference film C2 having a thickness of 75 µm.

When the phase difference film C2 was observed by a small angle scattering method in which an X-ray was made incident on the cross section of the film by the aforementioned method, a lamellar structure having an interphase distance of 40 nm and a thickness of the phase of 20 nm was observed. A slice of a cross section that is parallel to the thickness direction was prepared and observed by TEM, and thereby a lamellar phase separation structure was confirmed.

The in-plane direction retardation Re(550) and the thickness-direction direction retardation Rth(550) of the obtained phase difference film C2 were measured at a wavelength of 550 mm. As a result, Re(550)=4 nm and Rth(550)=90 nm, and it was therefore confirmed that a property that is analogous to a negative C plate was obtained by the structural birefringence. Rth(450)/Rth(550)=1.20>1, and therefore the phase difference film C2 exhibited a forward wavelength dispersion property.

The phase difference film C2 thus obtained was installed in a liquid crystal display device in accordance with the aforementioned procedure, and display performance of the liquid crystal display device was evaluated. As a result, color shift of the observation from the front direction and the tilted direction was inferior to that of Example A1.

From the results described above, the following findings are revealed.

The phase difference film C1 of Comparative Example A1 that does not contain the copolymer does not exhibit a reverse wavelength dispersion property and results in poor color shift evaluation of the observation from the front direction and the tilted direction.

Nevertheless having a lamellar phase separation structure, the phase difference film C2 that does not satisfy f(B) (in Reference Example A2, the weight fraction wB of the polymerization unit B in copolymer P)>0.5 does not either exhibit a reverse wavelength dispersion property, and results in poor color shift evaluation of the observation from the front direction and the tilted direction.

On the contrary, the phase difference film 1 of Example A1 that satisfies f(B) (in Example A1, the weight fraction wB of the polymerization unit B in copolymer P)>0.5 and that has a lamellar phase separation structure exhibits a reverse wavelength dispersion property and results in good color shift evaluation of the observation from the front direction and the tilted direction.

Example B1 to Example B6

[Evaluation Method]

Method for Measuring Thermal Softening Temperature

The resin to be measured was molded into a film of 5 mm×20 mm×100 µm to prepare a sample. This sample was subjected to the thermomechanical analysis (TMA) measurement using a thermomechanical analyzer ("TMA/SS7100" manufactured by SII NanoTechnology Inc.) to measure the thermal softening temperature. Specifically, the temperature was changed from 20° C. to 180° C. at a speed of 5° C./min while the sample was applied with a tension of 50 mN in its lengthwise direction. The temperature when the length of the sample changed by 3% was obtained as the thermal softening temperature.

(Method for Measuring Re, Rth, Δn and NZ Factor of Phase Difference Film)

The in-plane direction retardation Re, the thickness-direction retardation Rth, and the NZ factor of the phase difference film were measured at a measurement wavelength of 550 nm using a phase difference meter ("AxoScan" manufactured by Axometrics, Inc.).

Further, the in-plane direction retardation Re of the phase difference film was divided by the thickness d to obtain the birefringence Δn of the phase difference film.

(Method for Evaluating Wavelength Dispersion Property)

The in-plane direction retardations Re(450), Re(550), and Re(650) of the phase difference film were measured at measurement wavelengths of 450 nm, 550 nm, and 650 nm using the phase difference meter ("AxoScan" manufactured by Axometrics, Inc.). From Re(450), Re(550), and Re(650) thus measured, Re(450)/Re(550) and Re(650)/Re(550) were calculated.

(Method for Evaluating Display Characteristics: λ/4 Plate (Examples B1 to B5))

As a polarizing plate including a protective film, a polarizer, and a protective film in this order, a long-length polarizing plate having the transmission axis in its width direction ("HLC2-5618S" manufactured by Sanritz Corp., thickness of 180 μm) was prepared. The protective film on one surface side of the polarizing plate was removed, and the phase difference films obtained in Examples B1 to B5 were each bonded to this surface. The bonding was performed such that the slow axis direction of the phase difference film and the transmission axis direction of the polarizing plate formed an angle of 45°. By these operations, circularly polarizing plate samples which included the phase difference films of Examples B1 to B5 as one of the protective films on both sides were obtained.

A commercially available organic EL display device ("OLED55EG9600" manufactured by LG Electronics) including a circularly polarizing plate and an organic EL element in this order from a view side was prepared. The circularly polarizing plate of this organic EL display device was replaced with the circularly polarizing plate sample described above. For the replacement, the circularly polarizing plate sample was disposed such that the phase difference film, the polarizer, and the protective film were disposed in this order from the side of the organic EL element. Further, the transmission axis of the polarizer of the circularly polarizing plate sample was set to the same direction as that of the transmission axis of the polarizer of the circularly polarizing plate originally included in the organic EL display device. An organic EL display device for evaluating display characteristics was obtained in this manner.

The display state of the organic EL display device thus obtained was observed from a direction tilted with respect to the display surface (45° relative to the normal direction) at various azimuth angles. The term "azimuth angle" described herein refers to a component of the aforementioned tilted direction that is parallel to the display surface.

The organic EL display device for evaluation was evaluated as "good" when the reflectance on the display surface is reduced at all azimuth angles as compared with the commercially available organic EL display device before replacing.

The organic EL display device for evaluation was evaluated as "poor" when the reflectance was equal to or worse than that of the commercially available organic EL display device before replacing at one or more azimuth angles.

(Method for Evaluating Display Characteristics: λ/2 Plate (Example B6))

As a polarizing plate including a protective film, a polarizer, and a protective film in this order, a long-length polarizing plate having the transmission axis in its width direction ("HLC2-5618S" manufactured by Sanritz Corp., thickness of 180 μm) was prepared. A protective film on one surface side of the polarizing plate was removed, and the phase difference film obtained in Example B6 was bonded to this surface. The bonding was performed such that the slow axis direction of the phase difference film coincided with the transmission axis direction of the polarizing plate. By these operations, a polarizing plate sample which included the phase difference film of Example B6 as one of the protective films on both sides was obtained.

A commercially available IPS liquid crystal display device ("23MP47HQ" manufactured by LG Electronics) including a light source-side polarizing plate, a liquid crystal cell, and a view-side polarizing plate in this order was prepared. The view-side polarizing plate of this IPS liquid crystal display device was replaced with the polarizing plate sample described above. For the replacement, the polarizing plate sample was disposed such that the phase difference film, the polarizer, and the protective film were disposed in this order from the side of the liquid crystal cell. Further, the transmission axis of the polarizer of the polarizing plate sample was set to the same direction as that of the transmission axis of the polarizer of the view-side polarizing plate originally included in the IPS liquid crystal display device. A liquid crystal display device for evaluating display characteristics was obtained in this manner.

The display state of the liquid crystal display device thus obtained was observed from a direction tilted with respect to the display surface (45° relative to the normal direction) at various azimuth angles.

The IPS liquid crystal display device for evaluation having high contrast at all azimuth angles as compared with the commercially available IPS liquid crystal display device before replacing was evaluated as "good".

Further, the IPS liquid crystal display device for evaluation having contrast equal to or worse than that of the IPS liquid crystal display device before replacing at one or more azimuth angles was evaluated as "poor".

Example B1

(1-1. Production of Hydrogenated Block Copolymer as Copolymer P)

Under a nitrogen atmosphere, in a dry pressure-resistant reaction vessel, in which an internal atmosphere had been replaced with nitrogen, 100 ml of toluene as a solvent and 127 μl (0.20 mmol) of a hexane solution containing 1.6 M of n-butyllithium as a polymerization catalyst were placed. Then, to the heat-resistant reaction vessel, 40 g of a toluene solution containing 25 wt % of 2-vinylnaphthalene as an aromatic vinyl-based compound was added, and the resulting mixture was reacted at 25° C. for 1 hour, thereby performing a polymerization reaction of a first stage. After completing the polymerization reaction of the first stage, a portion of the polymer was collected and subjected to a measurement of the molecular weight by GPC using tetrahydrofuran as a solvent to confirm that the polymer had the number-average molecular weight (Mn) of 33,000, the weight-average molecular weight (Mw) of 34,600, and the molecular weight distribution of 1.05. Further, the conversion ratio of 2-vinylnaphthalene measured by $^1$H-NMR using deuterated chloroform as a solvent was 95%.

Subsequently, to the reaction mixture in the heat-resistant reaction vessel, 5 g of isoprene as a chain conjugated diene-based compound was added, and the resulting mixture was reacted at 50° C. for 0.5 hours, thereby performing a polymerization reaction of a second stage. As a result, a diblock copolymer having a block configuration of (2-vinylnaphthalene block)—(isoprene block) was obtained in the reaction mixture. The GPC measurement revealed that the diblock copolymer had the number-average molecular weight (Mn) of 68,000, the weight-average molecular weight (Mw) of 72,000, and the molecular weight distribution of 1.06. The $^1$H-NMR measurement confirmed that all of 2-vinylnaphthalene remained in the first stage was consumed and the conversion ratio of isoprene was 96%. Further, on the basis of the ratio of integrated values of olefin portions, a microstructure of the isoprene block was constituted of 94% of poly(1,4-isoprene) and 6% of poly(1,2-isoprene) and poly(3,4-isoprene).

Subsequently, to the reaction mixture, 40 g of a toluene solution containing 25 wt % of 2-vinylnaphthalene as an aromatic vinyl-based compound was added, and the resulting mixture was reacted at 25° C. for 17 hours, thereby performing a polymerization reaction of a third stage. After completing the polymerization reaction, 100 μL of methanol was added to obtain a triblock copolymer having a block configuration of (2-vinylnaphthalene block)-(isoprene block)-(2-vinylnaphthalene block) in the reaction mixture. A portion of the triblock copolymer was collected and subjected to a measurement of the molecular weight by GPC to confirm that the triblock copolymer had the number-average molecular weight (Mn) of 106,000, the weight-average molecular weight (Mw) of 117,600, and the molecular weight distribution of 1.11. Further, the $^1$H-NMR measurement confirmed that isoprene remained in the polymerization in the second stage and 2-vinylnaphthalene added in the third stage were all consumed.

The triblock copolymer thus obtained was concentrated, and, after toluene was removed, the concentrated product was dissolved in 700 ml of p-xylene. To this solution, 55 g of p-toluenesulfonyl hydrazide was added, and, after oxygen in the solution was removed by repeatedly performing a combination of pressure reduction and nitrogen substitution operations, the solution was allowed to react at a temperature of 120° C. for 6 hours. By this reaction, double bonds of the isoprene block were hydrogenated. After completing the hydrogenation, a large quantity of acetone and methanol were poured to the reaction solution to obtain a hydrogenated block copolymer as 20 g of a massive product. The hydrogenated block copolymer thus obtained had a triblock configuration of "polymer block [A]"—"polymer block [B]"—"polymer block [A]". The polymer block [A] includes the 2-vinylnaphthalene unit. The polymer block [B] includes the hydrogenated isoprene unit.

The hydrogenated block copolymer obtained as the copolymer P was analyzed by NMR. As a result, the weight ratio (wA:wB) of the 2-vinylnaphthalene unit and the hydrogenated isoprene unit in the hydrogenated block copolymer was 80:20. Thus, the weight fraction wA of the polymer block [A] was 80% (0.80) and the weight fraction wB of the polymer block [B] was 20% (0.20). Further, the hydrogenation ratio of the hydrogenated isoprene unit in the hydrogenated block copolymer was >99%. Further, the number-average molecular weight of the triblock copolymer measured by GPC was 106,000. Further, the thermal softening temperature Td of the hydrogenated block copolymer measured by TMA was 133° C.

(1-2. Melt Extrusion Step)

An intermediate film was produced using the hydrogenated block copolymer described above as the thermoplastic resin C by the melt extrusion method. Specifically, the following operations were performed.

An extrusion molding apparatus including a cooling roll and a die disposed such that therethrough a molten resin can be extruded on the cooling roll was prepared.

The thermoplastic resin C was melted using the extruder, supplied to the die, and extruded from the die on the cooling roll in a film shape. The extruded resin C was received on the cooling roll and cooled while being conveyed by the rotation of the cooling roll, thereby being cured. In this manner, an intermediate film having a thickness of 200 μm formed from the hydrogenated block copolymer as the thermoplastic resin C. The extrusion temperature Te of the thermoplastic resin C was 261° C. Further, the temperature Tc of the cooling roll was 78° C.

(1-3. Stretching Treatment Step)

The intermediate film thus obtained was cut to prepare a rectangular film having a size of 80 mm×80 mm. This rectangular film was subjected to free-width uniaxial stretching using a batch-type stretching apparatus (manufactured by Toyo Seiki Kogyo Co. Ltd.). The stretching was performed under conditions of a stretching temperature $T_E$ of 150° C., a stretching ratio of 4.0 times, and a stretching speed of 100%/min. As a result, a phase difference film as a λ/4 plate was obtained. The phase difference film thus obtained was evaluated by the above-described methods.

Examples B2 and B3

In the step (1-2), the thickness of the intermediate film was changed as shown in Table 1. Changing of the thickness of the intermediate film was effected by adjusting the rotation speed of the cooling roll whereby the take-up speed of the molten resin by the cooling roll was adjusted. The method of changing the thickness of the intermediate film is the same in the following Examples.

In the step (1-3), the stretching conditions of the intermediate film were changed as shown in Table 1.

Except for the foregoing matters, phase difference films as a λ/4 plate were produced and evaluated by the same manner as that of Example B1.

Example B4

In the step (1-1), the amounts of 2-vinylnaphthalene used in the polymerization reaction of the first stage, isoprene used in the polymerization reaction of the second stage, and 2-vinylnaphthalene used in the polymerization reaction of the third stage were changed to 8 g, 8 g and 8 g, respectively. When GPC measurement was performed in the same manner as that in Example B1, it was confirmed that, as to the triblock copolymer before hydrogenation, the number-average molecular weight (Mn) was 120,000, the weight-average molecular weight (Mw) was 133,000, and the molecular weight distribution was 1.11. Further, from the $^1$H-NMR measurement of the diblock copolymer after the polymerization of the second stage, the microstructure of the isoprene block was found to be constituted of 92% of poly(1,4-isoprene), and 8% of poly(1,2-isoprene) and poly(3,4-isoprene). From the GPC measurement of the hydrogenated block copolymer after hydrogenation, it was confirmed that the number-average molecular weight (Mn) was 129,000, the weight-average molecular weight (Mw) was 144,000, and the molecular weight distribution was 1.12.

In the step (1-2), the extrusion conditions of the thermoplastic resin C were changed as shown in Table 1.

In the step (1-3), the stretching conditions of the intermediate film were changed as shown in Table 1.

Except for the above-described matters, a phase difference film as a λ/4 plate was produced and evaluated by the same manner as that of Example B1.

Example B5

In the step (1-1), the amounts of 2-vinylnaphthalene used in the polymerization reaction of the first stage, isoprene used in the polymerization reaction of the second stage, and 2-vinylnaphthalene used in the polymerization reaction of the third stage were changed to 9 g, 6 g and 9 g, respectively. When GPC measurement was performed in the same manner as that in Example B1, it was confirmed that, as to the obtained triblock copolymer before hydrogenation, the number-average molecular weight (Mn) was 95,000, the weight-average molecular weight (Mw) was 106,000, and the molecular weight distribution was 1.12. Further, from the $^1$H-NMR measurement of the diblock copolymer after the polymerization of the second stage, the microstructure of the isoprene block was found to be constituted of 92% of poly(1,4-isoprene), and 8% of poly(1,2-isoprene) and poly(3,4-isoprene). From the GPC measurement of the hydrogenated block copolymer after hydrogenation, it was confirmed that the number-average molecular weight (Mn) was 103,000, the weight-average molecular weight (Mw) was 116,000, and the molecular weight distribution was 1.13.

In the step (1-2), the extrusion conditions of the thermoplastic resin were changed as shown in Table 1.

In the step (1-3), the stretching conditions of the intermediate film were changed as shown in Table 1.

Except for the above-described matters, a phase difference film as a λ/4 plate was produced and evaluated by the same manner as that of Example B1.

Example B6

In the step (1-1), the amounts of 2-vinylnaphthalene used in the polymerization reaction of the first stage, isoprene used in the polymerization reaction of the second stage, and 2-vinylnaphthalene used in the polymerization reaction of the third stage were changed to 9 g, 6 g and 9 g, respectively. When GPC measurement was performed in the same manner as that in Example B1, it was confirmed that, as to the obtained triblock copolymer before hydrogenation, the number-average molecular weight (Mn) was 95,000, the weight-average molecular weight (Mw) was 106,000, and the molecular weight distribution was 1.12. Further, from the $^1$H-NMR measurement of the diblock copolymer after the polymerization of the second stage, the microstructure of the isoprene block was found to be constituted of 92% of poly(1,4-isoprene), and 8% of poly(1,2-isoprene) and poly(3,4-isoprene). From the GPC measurement of the hydrogenated block copolymer after hydrogenation, it was confirmed that the number-average molecular weight (Mn) was 103,000, the weight-average molecular weight (Mw) was 116,000, and the molecular weight distribution was 1.13. In the step (1-2), the extrusion conditions of the thermoplastic resin were changed as shown in Table 1.

In the step (1-3), the stretching conditions of the intermediate film were changed as shown in Table 1.

Except for the above-described matters, a phase difference film as a λ/2 plate was produced by the same manner as that of Example B1. The resulting phase difference film was evaluated by the foregoing methods.

Results of Examples B1 to B6

The results of Examples B1 to B6 are shown in Table below. Meanings of abbreviations in Table below are as follows.

VN: 2-vinylnaphthalene
IP: isoprene
ABA: triblock configuration of [A]-[B]-[A]

TABLE 1

[Results of Examples B1 to B6]

| | Ex. B1 | Ex. B2 | Ex. B3 | Ex. B4 | Ex. B5 | Ex. B6 |
|---|---|---|---|---|---|---|
| Hydrogenated block copolymer | | | | | | |
| Block [A] | VN | VN | VN | VN | VN | VN |
| Block [B] | IP | IP | IP | IP | IP | IP |
| wA | 80 | 80 | 80 | 67 | 75 | 75 |
| wB | 20 | 20 | 20 | 33 | 25 | 25 |
| Block configuration | ABA | ABA | ABA | ABA | ABA | ABA |
| Thermal softening temperature Td (° C.) | 133 | 133 | 133 | 141 | 137 | 137 |
| First step | | | | | | |
| Extrusion type | Melt extrusion | Melt extrusion | Melt extrusion | Melt extrusion | Melt extrusion | Melt extrusion |
| Extrusion temperature Te (° C.) | 261 | 261 | 261 | 288 | 288 | 288 |
| Cooling roll temperature Tc (° C.) | 78 | 78 | 78 | 90 | 86 | 86 |
| Intermediate film thickness (μm) | 200 | 293 | 162 | 142 | 103 | 199 |

TABLE 1-continued

[Results of Examples B1 to B6]

| | Ex. B1 | Ex. B2 | Ex. B3 | Ex. B4 | Ex. B5 | Ex. B6 |
|---|---|---|---|---|---|---|
| Second step | | | | | | |
| Stretching type | Uniaxial stretching | Uniaxial stretching | Uniaxial stretching | Uniaxial stretching | Uniaxial stretching | Uniaxial stretching |
| Stretching ratio (times) | 4.0 | 1.5 | 1.1 | 1.2 | 1.5 | 1.5 |
| Stretcing temperature $T_E$(° C.) | 150 | 150 | 145 | 150 | 150 | 150 |
| $T_E$ − Td(° C.) | 17 | 17 | 12 | 9 | 13 | 13 |
| Phase difference film | | | | | | |
| Re(nm) | 140.0 | 140.0 | 140.0 | 140.0 | 140.0 | 270.0 |
| Rth(nm) | −81.2 | −64.4 | −81.2 | 151.2 | −15.4 | −29.7 |
| Δn | 0.0014 | 0.0006 | 0.0009 | 0.0011 | 0.0017 | 0.0017 |
| Thickness d(μm) | 100 | 243 | 156 | 131 | 84 | 162 |
| NZ factor | −0.08 | 0.04 | −0.08 | 1.58 | 0.39 | 0.39 |
| Birefringence | Negative | Negative | Negative | Positive | Negative | Negative |
| Re(450)/Re(550) | 0.85 | 0.74 | 0.94 | 0.91 | 0.92 | 0.92 |
| Re(650)/Re(550) | 1.06 | 1.10 | 1.02 | 1.03 | 1.03 | 1.03 |
| Display characteristics | Good | Good | Good | Good | Good | Good |

The aforementioned results show that the phase difference film of the present invention has the reverse wavelength dispersion property and can be easily produced at a low cost.

REFERENCE SIGN LIST 10 phase difference film
20 resin
30 intermediate film
100 extrusion molding apparatus
110 die
120 cooling roll
200 stretching apparatus

The invention claimed is:

1. A phase difference film composed of a resin C containing a copolymer P including a polymerization unit A and a polymerization unit B wherein the polymerization unit A is an aromatic vinyl-based unit and the polymerization unit B is a hydrogenated chain conjugated diene-based unit,
the phase difference film including a lamellar phase separation structure that generates a structural birefringence,
the phase separation structure including a phase (A) having the polymerization unit A as a main component and a phase (B) having the polymerization unit B as a main component,
an in-plane direction retardation Re(550) measured at a wavelength of 550 nm being 0 nm or more and 10 nm or less,
a thickness-direction retardation Rth(550) measured at a wavelength of 550 nm being 80 nm or more and 300 nm or less, and
the phase difference film satisfying the following formulae (1A) and (2), or the following formulae (1B) and (2), $f(A)>0.5$ (1A)

$f(B)>0.5$ (1B)

$D(A)>D(B)$ (2)

wherein
f(A) represents a total weight ratio of the polymerization unit A in the copolymer P,
f(B) represents a total weight ratio of the polymerization unit B in the copolymer P, $D(A)=ReA(450)/ReA(550)$, $D(B)=ReB(450)/ReB(550)$, ReA(450) represents an in-plane direction retardation (nm) of a film (A) formed from a polymer (A) composed of the polymerization unit A measured at a wavelength of 450 nm,
ReA(550) represents an in-plane direction retardation (nm) of the film (A) measured at a wavelength of 550 nm,
ReB(450) represents an in-plane direction retardation (nm) of a film (B) formed from a polymer (B) composed of the polymerization unit B measured at a wavelength of 450 nm, and
ReB(550) represents an in-plane direction retardation (nm) of the film (B) measured at a wavelength of 550 nm.

2. The phase difference film according to claim 1, further satisfying the following formula (3):

$D(A)≥1.06$ (3).

3. The phase difference film according to claim 1, further satisfying the following formula (4):

$(D(A)−D(B))≥0.04$ (4).

4. The phase difference film according to claim 1, wherein a ratio (Rth(450)/Rth(550)) of a thickness-direction retardation Rth(450) measured at a wavelength of 450 nm relative to the thickness-direction retardation Rth(550) is 0 or more and less than 1.

5. The phase difference film according to claim 4, wherein the ratio (Rth(450)/Rth(550)) of the thickness-direction retardation Rth(450) relative to the thickness-direction retardation Rth(550) is 0.75 or more and 0.95 or less.

6. The phase difference film according to claim 1, wherein each of thicknesses of the phase (A) and the phase (B) in the lamellar phase separation structure is 50 nm or less.

7. The phase difference film according to claim 1, wherein an absolute value (|n(a)−n(b)|) of a difference between a refractive index n(a) of the polymer (A) and a refractive index n(b) of the polymer (B) is 0.05 or more.

8. The phase difference film according to claim 1, wherein an interphase distance in the phase separation structure is 200 nm or less.

9. The phase difference film according to claim 1, wherein the copolymer P is a block polymer having a block (A) having the polymerization unit A as a main component and a block (B) having the polymerization unit B as a main component.

10. The phase difference film according to claim 1, wherein
the copolymer P includes a triblock copolymer P', and
the triblock copolymer P' is an (A)-(B)-(A) triblock copolymer having a block (A) having a polymerization unit A as a main component and a block (B) having a polymerization unit B as a main component.

11. The phase difference film according to claim 1, wherein
the copolymer P includes a pentablock copolymer P''', and
the pentablock copolymer P''' is an (A)-(B)-(A)-(B)-(A) pentablock copolymer having a block (A) having the polymerization unit A as a main component and a block (B) having the polymerization unit B as a main component.

12. A method for producing the phase difference film according to claim 1, the method comprising:
a first step of performing melt extrusion of the resin C including the copolymer P having the polymerization unit A and the polymerization unit B onto a cooling roll to obtain an intermediate film; and
a second step of subjecting the intermediate film to a stretching treatment, wherein
a thermal softening temperature Td of the copolymer P and a temperature Tc of the cooling roll satisfy the following formula (5):

$Tc < Td - 50° C.$     (5).

13. The method for producing the phase difference film according to claim 12, satisfying the formulae (1A) and (2).

14. The method for producing the phase difference film according to claim 12, satisfying the formulae (1B) and (2).

* * * * *